United States Patent

Hedin et al.

[15] 3,662,342

[45] May 9, 1972

[54] KEY-CONTROLLED ELECTRONIC SECURITY SYSTEM

[72] Inventors: Robert A. Hedin, Yorba Linda, Calif.; Leo J. Pantas, Greenwich, Conn.

[73] Assignee: R. B. Phinizy, Anaheim, Calif.

[22] Filed: Feb. 16, 1971

[21] Appl. No.: 115,353

Related U.S. Application Data

[63] Continuation-in-part of Ser. No. 889,666, Dec. 31, 1969, abandoned.

[52] U.S. Cl. ..............................340/147, 340/149, 340/274, 340/286

[51] Int. Cl. ......................................G08b 13/08, H04q 9/00

[58] Field of Search .........................340/149, 147, 286, 274; 235/61.7

[56] References Cited

UNITED STATES PATENTS

| | | | |
|---|---|---|---|
| 3,403,380 | 9/1968 | Welch | 340/149 |
| 3,500,326 | 3/1970 | Benford | 340/147 |
| 3,518,655 | 6/1970 | Saul | 340/276 X |

*Primary Examiner*—Donald J. Yusko
*Attorney*—Teagno & Toddy

[57] ABSTRACT

A key-actuated electronic security system having first and second keys each constituted by a plurality of circuit paths in a pattern of closed and open circuits. The system includes comparing means which electrically compares respective ones of the circuit paths of the keys and which delivers an output signal when there is a predetermined correspondence between respective ones of the circuit paths of the keys. In an embodiment employing a NAND gate, the correspondence is constituted by a complementary relationship and in an embodiment employing Exclusive-OR gates, the correspondence may be constituted by either a complementary or an identical relationship. The system includes means, e.g., a latch, responsive to the output signal for indicating the predetermined correspondence. One of the keys is readily changeable to modify its circuit pattern so that there will not be the predetermined correspondence whereby the changed key will be inoperative to cause the comparing means to deliver an output signal and thus requiring the use of a third key having circuit paths providing a predetermined correspondence with the circuit paths of the changed key in order to cause the comparing means to deliver an output signal.

Disclosed also is a key-actuated security system including a plurality of remote stations and a central control station. Each of the remote stations is adapted to provide electrical interconnection with one of the keys. The central station is adapted to receive a plurality of keys, each one of these keys corresponding to one of the remote stations. Key comparing means delivers an output signal when there is a predetermined correspondence between respective ones of the circuit paths of the key received at the remote station and of a particular one of the keys of the first set received at the central control, this output signal being transmitted to the remote station for operating a latch.

42 Claims, 14 Drawing Figures

Robert A. Hedin,
Leo J. Pantas,
Inventors.
Hogan & Toddy
attys

KEY-CONTROLLED ELECTRONIC SECURITY SYSTEM

CROSS-REFERENCE TO RELATED APPLICATION

This application is a continuation-in-part of the application of the present inventors for U.S. patent, entitled Key-Controlled Electronic Security System, Ser. No. 889,666 and now abandoned, filed Dec. 31, 1969.

BACKGROUND OF THE INVENTION

The present invention relates to electric lock systems or electronic security systems and more particularly to a key-actuated electronic security system which employs pairs of keys constituted by a plurality of circuit paths and which is operative to compare the keys to determine whether they have a predetermined correspondence.

There have been proposed electric or electronic lock systems wherein a key (or push-button switches, etc., in effect defining a key) is interconnected with electrical or electronic apparatus to determine whether the key (or a particular pattern of operated push-button switches) is correct in order to grant access to a controlled area, for example, as by electrically unlatching a door. One such particularly advantageous type of system is that disclosed in Hedin et al. U.S. Pat. No. Re. 27,013. The system described in said patent employs keys having a plurality of circuit paths in a pattern of closed and open circuits establishing a binary code combination. Key-responsive circuitry is described in said patent which will deliver an output signal for unlatching the door if a key received in a key receptacle has a predetermined proper code combination which is in effect wired into the circuitry.

While useful for many applications, such prior art systems, whether they employ removable keys or key-equivalent means such as push buttons, typically require rewiring of the circuitry or rearrangement of a plug board, etc., to change the code or combination. Such requirements are inconvenient or time-consuming. Further, in the use of pre-wired key-responsive circuitry, it may be necessary to stock a number of different circuits having various different codes or combinations, which is expensive. Another disadvantage with these prior art systems is that considerable documentation may be required in order to maintain records of the various codes associated with keys and with the key-responsive lock circuitry. These various problems are compounded in large or centrally controlled electronic security systems where there may be a large number of remote stations each securing a different door.

SUMMARY OF THE INVENTION

Among the several objects of the invention may be noted the provision of an electronic security system; the provision of such a system employing keys each constituted by a plurality of circuit paths in a pattern of closed and open circuits; the provision of such a system operative to compare a pair of said keys to determine whether they have a predetermined correspondence; the provision of such a system including means for comparing respective ones of the circuit paths of the keys which is operative to produce a signal for energizing electrically actuatable lock means for unlocking when there is said predetermined correspondence between the circuit paths of the keys and which is operative to produce a signal for energizing alarm means when there is other than said predetermined correspondence; the provision of such a system wherein said predetermined correspondence is constituted by either a complementary or an identical relationship, the provision of such a system wherein one of the keys is readily changeable, in effect defining a new key code or combination thereby greatly facilitating changing of the code or combination and obviating large stockage of pre-wired coded circuitry, eliminating the use of plug boards, and making extensive code documentation unnecessary; the provision of such a system including a central control station and a plurality of remote stations each adapted to receive one of the keys, the central station being adapted to receive a plurality of keys, one for each of the remote stations, the latter keys being readily changed in order to change, in effect, the code or combination at each of the remote stations; the provision of such a system having a central control station and remote stations wherein a single cable may be employed for interconnecting a plurality of remote stations with the central control station; the provision of such a system wherein the same set of leads in the cable may be used for both interrogation of the remote stations and transmission of the key codes therefrom to the central station; the provision of such a system which is extremely difficult, if not impossible, to defeat; the provision of such a system in which integrated circuitry may be used extensively, providing a system which is small in size, economical, highly reliable and of relatively simple construction. Other objects and features will be in part apparent and in part pointed out hereinafter.

Briefly, a key-actuated electronic security system of the present invention utilizes keys each constituted by a plurality of circuit paths in a pattern of closed and open circuits. The system includes a first means for receiving a first one of the keys which provides electrical interconnection with individual ones of the circuit paths of the first key and a second means for receiving a second one of the keys and which provides electrical interconnection with individual ones of the circuit paths of the second key. Means is provided for electrically comparing respective ones of the circuit paths of the keys. This means is operative to deliver an output signal when there is a predetermined correspondence between the respective ones of the circuit paths of the keys. There is further provided means, such as an electrically actuatable lock means, i.e., a latch, which is responsive to this output signal for indicating the predetermined correspondence between the ones of the circuit paths of the keys.

According to another aspect of the invention, a security system of the invention includes a plurality of remote stations each adapted to provide electrical interconnection with one of the aforesaid keys. A central control station is interconnected with the remote stations and is adapted to provide electrical interconnection with a plurality of the keys, each of these latter keys corresponding to one of the remote stations. The control station includes means for comparing circuit paths of successive ones of the individual keys interconnected at remote stations with respective circuit paths of corresponding ones of the plurality of keys at the central station. This comparing means is operative to deliver an output signal when there is a predetermined correspondence between respective ones of the circuit paths compared. Also included in the central station is circuitry for transmitting the latter output signal to the appropriate remote station where a key provides this predetermined correspondence. Means such as a door latch is provided at the remote station serving to indicate, as by unlatching, this predetermined correspondence.

BRIEF DESCRIPTION OF THE DRAWINGS

Corresponding reference characters indicate corresponding parts throughout the several views of the drawings.

DESCRIPTION OF THE PREFERRED EMBODIMENT

Figures 1, 3:
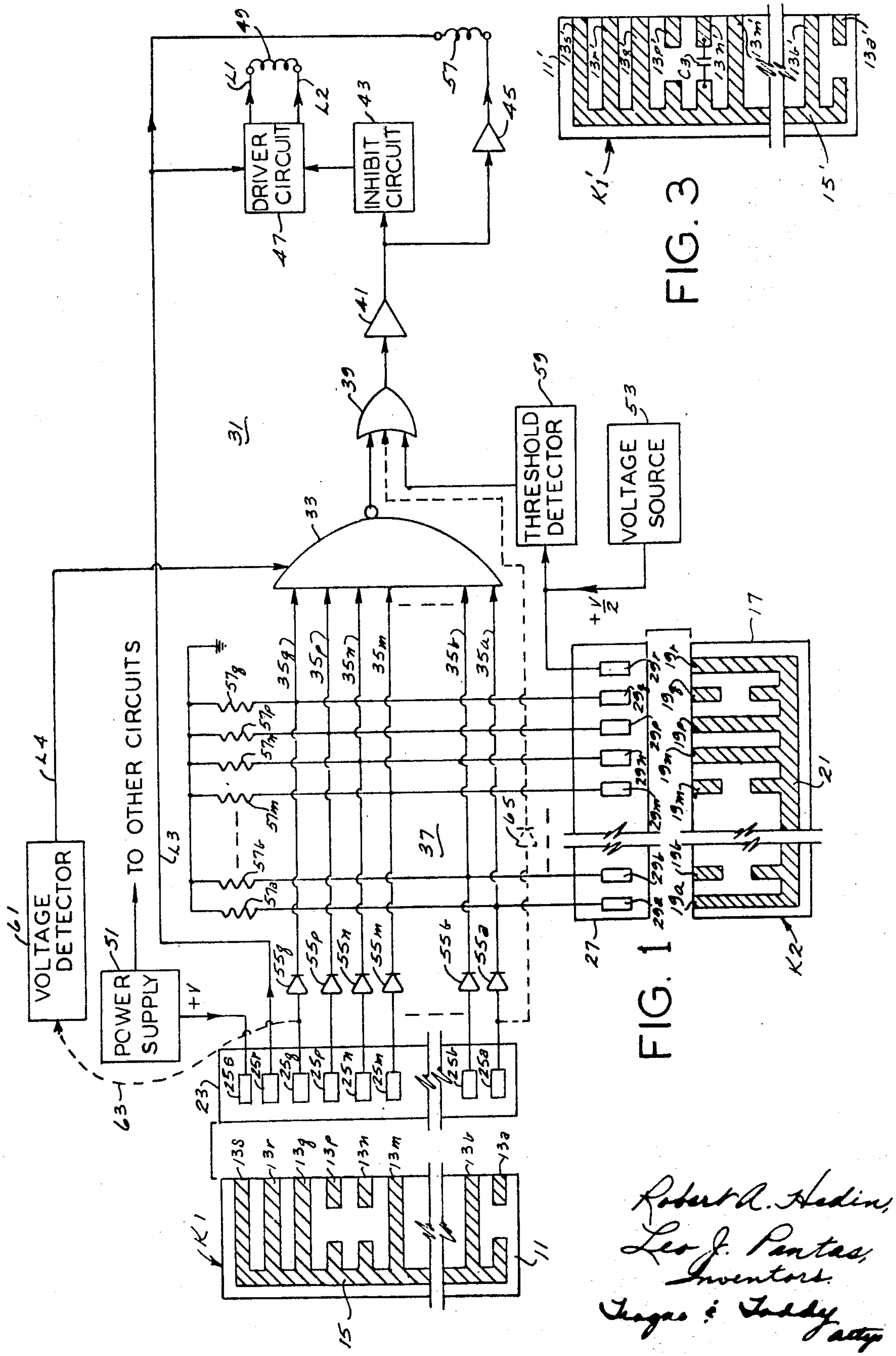
FIG. 1 is a partly schematic, partly block-diagrammatic illustration of circuitry of a key-actuated electronic security system of the invention which is responsive to a pair of keys having respective circuit paths which have a complementary correspondence.
FIG. 3 is a diagrammatic view of a particular embodiment of a key useful in the FIG. 1 system.

Referring now to FIG. 1, a key-actuated electronic security system of the invention includes first and second keys, generally indicated at K1 and K2, respectively, of the type described in the above-mentioned Hedin et al. U.S. Pat. No. Re. 27,013 and which are constituted by a plurality of circuit paths arranged in a binary code combination or permutation of closed and open circuits. As said patent discloses, keys of the above type have relatively thin, flat conductor strips mounted on the surface of a flat nonconductive member, some of these conductors being electrically connected in common by means of a common conductor.

As to key K1, the nonconductive member is designated 11 and the conductors are designated 13*a*, 13*b*, . . . , 13*m*, 13*n*, etc., the total number of these conductors being a matter of choice determined by the desired total number of possible code permutations. Some of these conductors, i.e., 13*b*, 13*m*, 13*q*, 13*r*, 13*s*, and possibly others not shown, are electrically connected in common with a common conductor 15, as by being integrally formed therewith. These latter conductors or circuit paths provide closed circuits. Others of the conductors, i.e., 13*a*, 13*n*, 13*p*, and possibly others not shown, are not connected to common conductor 15, by virtue of having had a segment removed from them, for example, and thus provide open circuits. As to key K2, the nonconductive member is designated 17, the conductors or circuit paths are designated 19*a*, 19*b*, . . . , 19*s*, conductors such as 19*a*, 19*n*, 19*p* and 19*r* providing closed circuits and others such as 19*b*, 19*m* and 19*q* providing open circuits. A common conductor is designated 21.

A receptacle 23 is provided for receiving key K1 and includes a plurality of contacts 25*a*, 25*b*, . . . , 25*s* for providing electrical interconnection with individual ones of the circuit paths, i.e., conductor of key K1. A similar receptacle 27 is provided for receiving key K2 and similarly includes contacts 29*a*, 29*b*, . . . , 29*r* for providing electrical interconnection with individual ones of the circuit path of key K2. Receptacle 23 may be located outside an area to which access is controlled by the system, as, for example, adjacent a door having an electric latch. Receptacle 27 may be located inside the controlled area or in some location where access is not available to unauthorized persons.

Circuitry indicated generally at 31 is provided for electrically comparing respective ones of the circuit paths of the keys and includes a NAND gate 33. Those skilled in the art will recognize NAND gate 33 as a type of logic gate means. It includes a plurality of inputs 35*a*, . . . , 35*q*, each of which is connected by means of a matrix 37 to a respective one of the contacts 25*a*, . . . , 25*q* and 29*a*, . . . , 29*q* of receptacles 23 and 27. The output of NAND gate 33 is supplied to an OR gate 39 whose output is amplified by an amplifier 41 and supplied to an inhibit circuit 43 and to a further amplifier 45. An output from inhibit circuit 43 is delivered to a driver circuit 47.

As will become clearer, the above circuitry 31 is operative to deliver an output signal, e.g., on a pair of leads L1 and L2 from driver circuit 47 to a means responsive to this signal, e.g., electronically actuatable lock means such as a latch whose coil is shown at 49, when there is a predetermined correspondence between respective ones of the circuit paths of keys K1 and K2. Thus the latch serves as a means responsive to this output signal for indicating this predetermined correspondence.

In this particular embodiment, this "unlatch" output signal is not delivered unless this predetermined correspondence between the respective ones of the circuit paths of the keys is constituted by a complementary relationship. Keys K1 and K2 are illustrated as providing this complementary relationship or coding.

Thus there is an open circuit path 13*a* of key K1 associated with a respective closed circuit path 19*a* of key K2, a closed circuit path 13*b* of key K1 associated with an open circuit path 19*b* of key K2, et cetera. Circuit paths 13*r* and 13*s* of key K1 do not correspond with circuit paths of key K2, however, but are instead used for a somewhat different purpose than the other circuit paths. This is also true for path or conductor 19*r* of key K2. At 51 is indicated a power supply which, by means of contact 25*s*, applies a voltage via conductor or closed path 13*s* to the common conductor 15 for applying voltage to the other closed circuit paths of key K1. This voltage may be of a value +V (as indicated). In a similar sense, a voltage source 53 applies a somewhat lower voltage, e.g., +V/2 (as indicated) to common conductor 21 via contact 29*r* and closed circuit path 19*r*.

The voltage +V on common conductor 15 is delivered through closed path 13*r* and contact 25*r* to a line L3 interconnected with driver circuit 47 in order to cause operation of the latch through energization of its coil 49 unless this energization is inhibited by the inhibit circuit 43, the latter being interconnected via amplifier 41 and OR gate 39 with NAND gate 33. As those skilled in the art know, the output of this NAND gate is "high" until all of its inputs are "high," i.e., energized, at which time this output becomes "l0w." If the keys provide the desired complementary relationship, it will be seen that each of the inputs to NAND gate 33 will be energized by the closed circuits of the keys, those of key K1 supplying a voltage of +V, through isolation diodes 55*a*, . . . , 55*q*, and those of key K2 a voltage of +V/2. These voltages, dropped across conventional so-called pull-down resistors 57*a*, . . . , 57*q*, which are actually part of the NAND gate, cause each of the inputs thereof to be "high." Hence, if the holder of a key inserts a "-correct" key K1 (as shown), i.e., one which provides a complementary relationship with key K2, the high output signal of NAND gate 33 (which signal acts as an inhibit signal) will become "low," permitting operation of the latch, thus permitting the holder of the key to enter the area controlled by the apparatus.

However, if a "wrong" key, i.e., one providing other than the complementary relationship, is inserted in key receptacle 23, the inhibit signal from NAND gate 33 will continue to be present. Thus a voltage on line L3 and the inhibit signal amplified by amplifier 45 may be used to operate an alarm which may be audible, visual, et cetera. A winding 57 such as that of an alarm relay, etc., is illustrated for this purpose.

From the foregoing it may be appreciated that it is only necessary to provide a different or modified pattern of closed and open circuits on key K2 in order to change the "coding" of the system. Thus if such a different key K2 is provided, i.e., different from that shown, a new "correct" key will have to be used for insertion in receptacle 23 in order to provide the complementary open and closed circuit relationship as between the keys. Thus if a key giving access to the controlled area is stolen, it is necessary only to change key K2 and to issue new "correct" keys to one or more authorized persons.

Should an attempt be made to compromise the system, i.e., by an attempted "picking" of this lock system by applying a voltage +V across all of contacts 55*a*, . . . , 55*q* which interconnect with the matrix with the purpose of energizing all inputs of NAND gate 33, this voltage will likewise appear on the contacts of receptacle 27, including, because of the closed circuit paths of key K2, contact 29*r*. This value +V will override the value +v/2 supplied by source 53. A voltage threshold detector 59 is provided which is operative to sense this increased voltage so that at some input voltage of a value greater than +V/2 but less than +V, it will deliver an output signal which is supplied as a further inhibit signal to OR gate 39, thus preventing actuation of the latch and, assuming that a potential is also applied to receptacle contact 25*r*, also causing operation of the alarm.

An attempt to circumvent operation of threshold detector 59 and to defeat the system by applying a voltage of +V/2 to contacts of key receptacle 23 will be detected by a voltage detector circuit 61 having an input connected by a jumper 63 to an arbitrary one of contacts 25*a*, . . . , 25*q*. Detector circuit 61 is operative, if an input voltage of +V/2 is applied to the input thereof, to deliver an output signal on a lead L4 to the NAND gate for causing the output of the latter to remain high, preventing actuation of the latch and, if a potential is also applied to receptacle contact 25*r*, also causing operation of the alarm.

As a further deterrent to "picking" or defeating the system, selected contacts of receptacle 23 may be wired to cause operation of the inhibit circuit and to also cause operation of the alarm. A circuit shown in phantom including a diode 65 is shown interconnected between contact 25*a* and OR gate 39. For key K1 to be "correct," circuit path 13*a* thereof must be an open one, as shown. If not, the voltage applied to contact 25*a* will provide an inhibit signal via OR gate 39, preventing operation of the latch and possibly also causing operation of the alarm.

Figure 2:
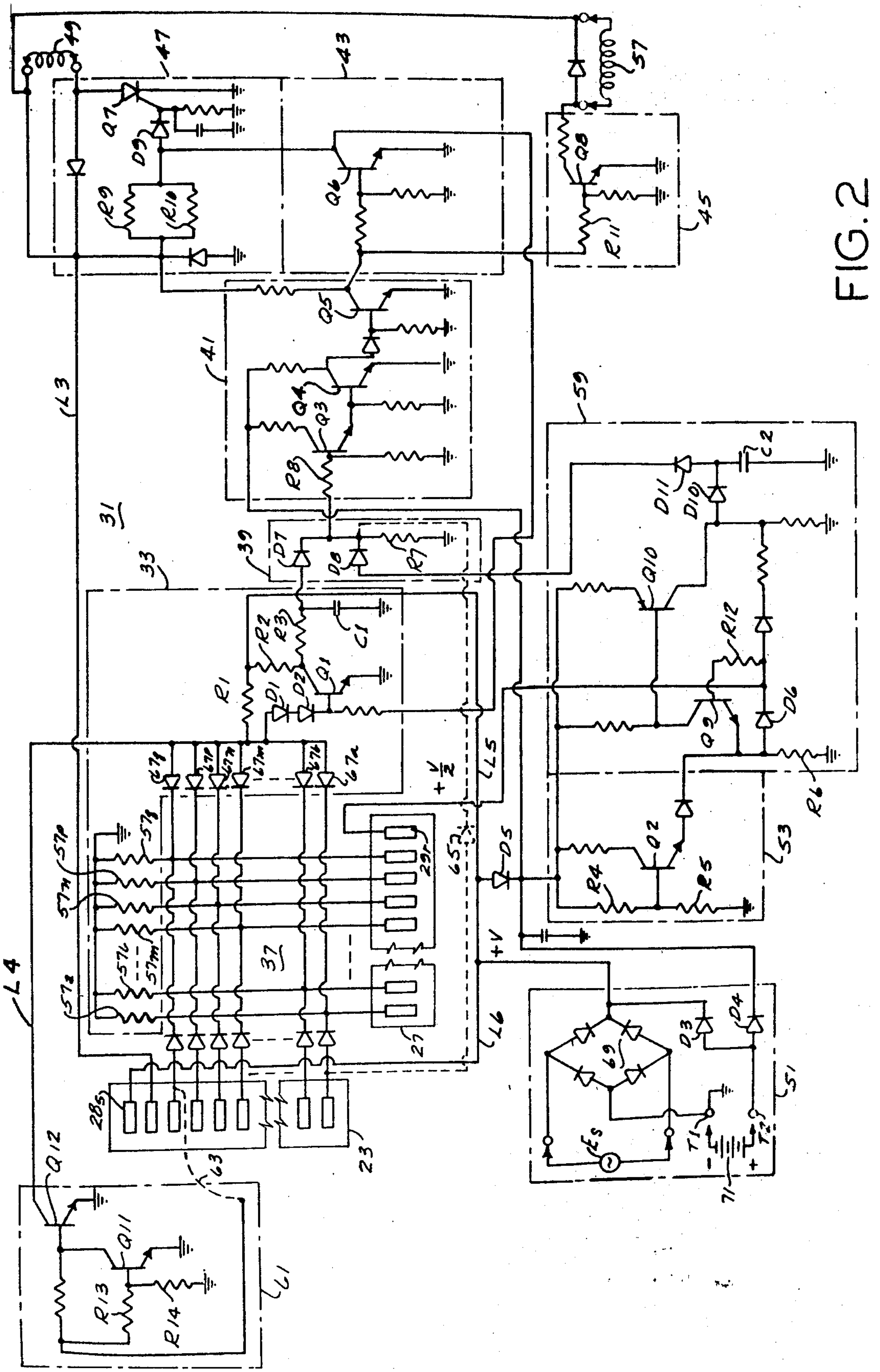
FIG. 2 is a detailed schematic circuit diagram of the security system shown in FIG. 1.

FIG. 2 shows in detail the circuitry of the electronic security system described above with reference to FIG. 1, each of the logic means or elements or other circuits represented in block form in FIG. 1 being outlined in FIG. 2.

NAND gate 33 is seen to comprise a plurality of diodes 67*a*, . . . , 67*q* of a number equal to the number of inputs to the NAND gate, their anodes being tied together and then connected through a series pair of diodes D1 and D2 to the base of a transistor Q1, and their cathodes each being connected to one of the pull-down resistors 57*a*, . . . , 57*q* by means of matrix 37. These diodes 67*a*, . . . , 67*q* are forward-biased by means of a voltage supplied from power supply 51 via a lead L5 from the latter through resistor R1.

However, where all input leads of NAND gate 33 are energized by closed circuits of keys inserted in key receptacles 23 and 27, the latter diodes are reverse-biased, and transistor Q1 is then biased into conduction, shunting current through resistor R2 to ground and thus terminating the inhibit output signal from this NAND gate. As long as diodes 67*a*, . . . , 67*q* are forward-biased, transistor Q1 is not biased into conduction. When the latter is nonconductive, a voltage is applied through a pair of resistors R2 and R3 and stored on a capacitor C1 to provide an output signal from the NAND gate acting as an inhibit signal.

Power supply 51 supplies its output voltage to receptacle contact 28*s* for this purpose through a lead L6 and is seen to comprise a conventional full-wave rectifier bridge 69 to which a.c. voltage of a level +V suitable for semiconductor circuitry is supplied by a suitable source E*s*. As is indicated, power supply 51 also includes a pair of terminals T1 and T2 which preferably are readily accessible to permit connection thereto of a battery 71 for operation of the system in the event of power failure, et cetera. Diodes D3 and D4 are provided for protection against incorrect battery polarity.

Voltage source 53, which supplies the voltage +V/2 to a key inserted in receptacle 27, includes a transistor Q2 which is biased by means of a voltage divider pair of resistors R4 and R5 across which power supply output voltage +V is dropped by means of a diode D5. Biasing of transistor Q2 is such that it provides an output voltage across a resistor R6 which is delivered through a diode D6 to receptacle contact 29*r*.

OR gate 39 comprises a pair of diodes D7 and D8 whose cathodes are tied together and biased to ground through a resistor R7 to provide the output terminal for the OR gate and whose anodes are interconnected with the outputs of NAND gate 33 and voltage threshold detector 59.

The output of OR gate 39 is delivered to amplifier 41 through a resistor R8 in the amplifier to the base of a transistor Q3, the collector of which is cascade-connected with the base of another transistor Q4, the emitter of which in turn controls the conduction of a further transistor Q5. Transistors Q3, Q4 and Q5 are biased in conventional manner.

Inhibit circuit 43 derives its inhibit input from the collector of transistor Q5. This inhibit input controls the conduction of a transistor Q6 whose collector-emitter circuit is connected to control the triggering of a silicon-controlled rectifier (SCR) Q7 of driver circuit 47. Latch coil 49 is series-connected in the cathode-anode circuit of SCR Q7 between lead L3 and ground. A triggering circuit for SCR Q7 includes a pair of resistors R9 and R10 interconnected in series with a diode D9 between lead L3 and the gate or triggering terminal of SCR Q7 to permit triggering of the SCR when there is a potential on lead L3 unless transistor Q6 is conductive. Thus conduction of transistor Q6 will inhibit triggering of SCR Q7 and thereby prevent energization of the latch.

Amplifier 45 for amplifying the inhibit signal for alarm purposes includes a single transistor Q8 which is biased into conduction by the inhibit signal applied to its base through a resistor R11 thereby to energize the alarm coil 57 (or any other suitable alarm means such as an indicator light, etc.) if there is a potential on lead L3.

An inhibit signal, it will be recalled, can also be provided by the voltage threshold detector 59 if the potential on receptacle contact 29*r* exceeds a threshold value greater than +V/2. Contact 29*r* is connected through a resistor R12 to the base of a transistor Q9 whose collector is interconnected with the base of a further transistor Q10 to control the conduction of the latter, biasing of transistor Q9 being such that if the predetermined voltage threshold is exceeded, transistor Q10 becomes conductive to supply a potential via a pair of diodes D10 and D11 as an inhibit signal input to OR gate 39. A capacitor C2 is provided between the cathode of diode D10 and ground in order to provide a so-called time penalty in the event the improper key is inserted in receptacle 23.

Somewhat similarly, voltage detector 61 has a pair of transistors Q11 and Q12, the collector-emitter circuit of the former being connected between the base of the latter and ground. Transistor Q11 is biased by means of a pair of resistors R13 and R14 such that if the potential on jumper lead 63 is either zero or +V (either of which is possible with a correct key), transistor Q12 will be nonconductive, permitting normal operation of NAND gate 33. However, if the potential is +V/2 as in the case of an attempt to "pick" or defeat the circuitry, transistor Q12 will become conductive such that by virtue of the path to ground through lead L4, transistor Q1 will be nonconductive, causing a high output from the NAND gate. This output serves, as noted previously, as an inhibit signal.

FIG. 3 illustrates a form a key may take in order to make difficult an attempt at defeating the system by ascertaining the coded arrangement of closed and open circuit paths of the key. It should be here understood that, in practice, keys of the system are preferably constructed such that only portions of the conductors sufficient to establish conductivity with contacts of the key receptacles are exposed to view, the remaining portions of the conductors being covered by a sheath, plastic coating, or the like, so that coding of the key is not apparent.

As FIG. 3 illustrates, a key K1' is provided which is substantially identical with the key K1 of FIG. 1 but which includes in addition a capacitor C3 connected across the open segment of conductor 13*p*'. Noting that unfiltered a.c. voltage is supplied by power supply 51 to receptacle contact 25*s*, it may be appreciated that there is an a.c. ripple component in the d.c. potential conductor 15' if key K1' is inserted in receptacle 23. This ripple component is passed through capacitor C3 and, by virtue of the appropriate isolation diode 55*n*, serves to energize an input to NAND gate 33. Hence, conductor path 13*n*' acts as a closed circuit in operation of the system. However, an attempt to detect the code of the key by using an ohmmeter, for example, will be unsuccessful since, to a d.c. source, capacitor C3 and hence also conductor or circuit path 13*p*' will appear as an open circuit. Capacitor C3 may be suitably buried beneath the surface of the key or covered or obscured by a material such as an epoxy compound.

Figures 4, 5:
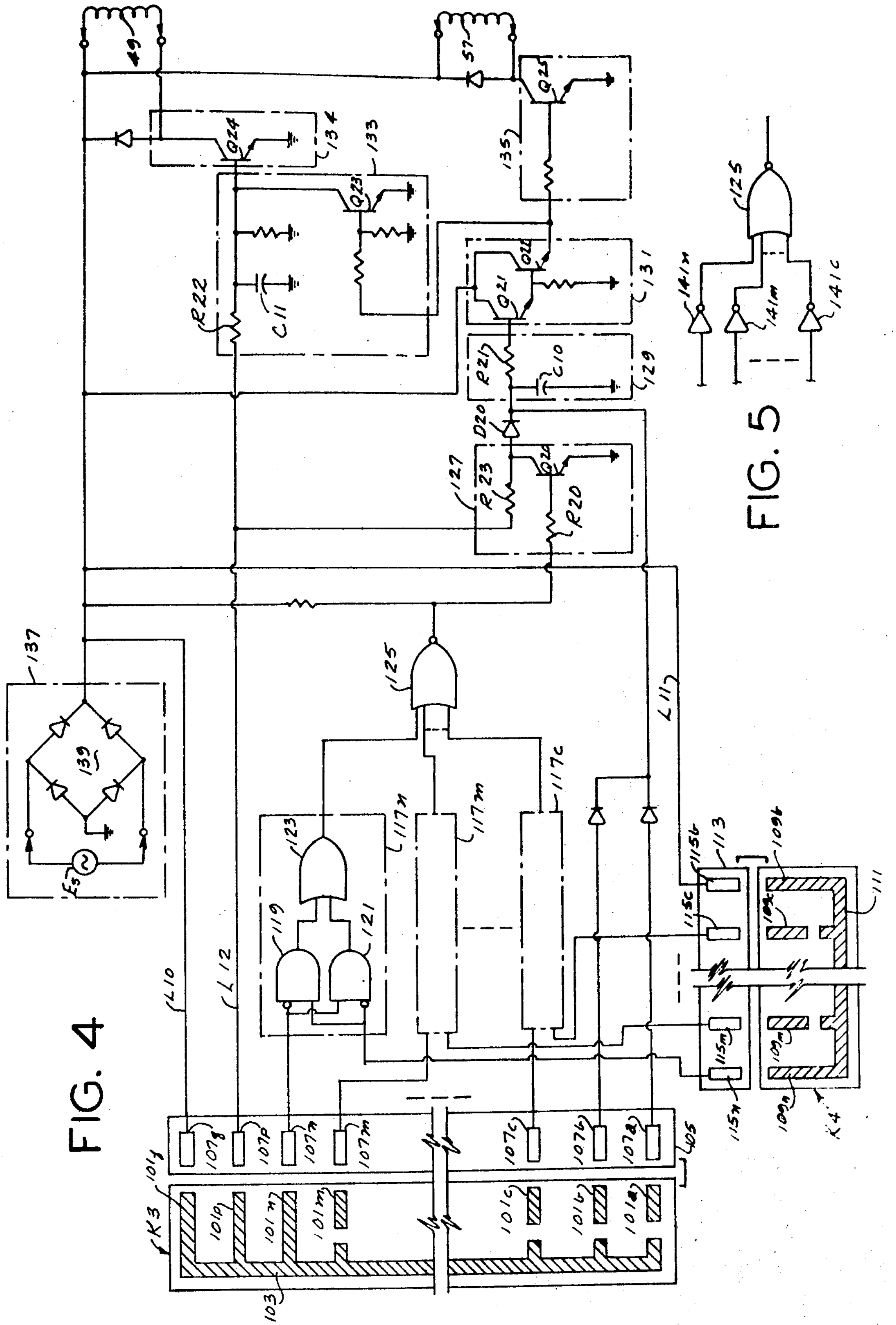
FIG. 4 is a detailed schematic circuit diagram of another embodiment of a key-actuated electronic security system of the invention responsive to keys having circuit paths which have an identical correspondence.
FIG. 5 is a schematic circuit diagram of an alternative form of a portion of the FIG. 4 circuitry, resulting in an embodiment responsive to keys having circuit paths which have a complementary correspondence.

Referring now to FIG. 4, an embodiment of the invention is shown which is responsive to keys which are identically coded, i.e., whose respective circuit paths have an identical relationship. A pair of keys K3 and K4 are shown which are of the same general type of key described hereinbefore in connection with FIGS. 1 and 2, having circuit paths arranged in a binary code combination or permutation of closed and open circuits.

Accordingly, key K3 has a plurality of conductors or circuit paths 101*a*, . . . , 101*q*, some of which provide open circuits and some of which provide closed circuits by virtue of being commonly connected by means of a common conductor 103. A receptacle 105 is provided for receiving this key and includes contacts 107*a*, . . . , 107*q*. Key K4 has corresponding conductors or circuit paths 109*c*, . . . , 109*n* providing closed or open circuits depending upon whether these paths are commonly connected by means of a common conductor 111. A receptacle 113 for key K4 has corresponding contacts 115*c*, . . . , 115*n*. Certain of the contacts on both keys, e.g., 109*b* of key K4 and 107*a*, 107*b*, 107*p* and 107*q* of key K3, are not used for defining a code or combination but for other purposes which will become apparent. Receptacle 105 is located, for example, outside an area controlled by the system permitting an authorized person to insert a key therein. Receptacle 113 may be located inside the controlled area or in a secure location.

Interconnected with corresponding receptacle contacts 107*c*, . . . , 107*n* and 115*c*, . . . , 115*n* are a plurality of Exclusive-OR gates 117*c*, . . . , 117*n*. Of these only gate 117*n* is shown in detail. Each has a pair of inputs and a single output. As those skilled in the art will recognize, if the two inputs of this type of logic gate means are either both "high" or both "low," the output of the Exclusive-OR gate will be "low." As is illustrated merely to facilitate understanding of the operation of these Exclusive-OR gates, taking gate 117*n* as an example, each of these gates includes a pair of AND gates 119 and 121 with a cross-connected pair of inputs, each AND gate having one inverting input which serves as one of the two inputs to the Exclusive-OR gate. The outputs of AND gates 119 and 121 provide inputs to an OR gate 123. The output of the latter constitutes the output of the Exclusive-OR gate. By virtue of the interconnection of inputs of these Exclusive-OR gates 117*c*, . . . , 117*n* with receptacle contacts, each of these inputs is adapted to be energized by interconnection with an individual closed circuit path of at least one of keys K3 and K4. As will become apparent, the purpose of these Exclusive-OR gates is to provide an inhibit signal when there is other than an identical relationship between respective ones of the circuit paths of the keys.

Keys K3 and K4 are shown as providing this identical relationship. Thus, conductors 101*c* and 109*c* both provide open circuits, 101*m* and 109*m* both provide open circuits, and 101*n* and 109*n* both provide closed circuits, and so on.

The outputs from Exclusive-OR gates 117*c*, . . . , 117*n* are interconnected to provide inputs to a further logic gate means, specifically a NOR gate 125. The output of the latter is connected to an inhibit circuit 127 to deliver a signal through a resistor R20 to the base of a transistor Q20 which provides an inhibit function according to whether or not it is biased into conduction.

The collector of transistor Q20 is connected through a diode D20 to a time-delay circuit 129 including a capacitor C10. The voltage on the latter is provided through a resistor R21 to the base of a transistor Q21 of an amplifier 131. Transistor Q21 is cascade-connected to another transistor Q22 whose emitter provides an amplified signal to another inhibit circuit 133 and to an alarm amplifier or driver 135.

Inhibit circuit 133 includes a transistor Q23 to the base of which is supplied this amplified signal. Transistor Q23 provides an inhibit function according to whether or not it is biased into conduction. For this purpose, its collector-emitter circuit is connected between ground and the base of a transistor Q24 which constitutes an amplifier or driver circuit 134 for controlling energization of latch coil 49 or other suitable lock means. Amplifier 135 includes a transistor Q25. When conductive, transistor Q25 causes energization of alarm coil 57. The latter, of course, may instead comprise other suitable means, such as an indicator lamp, for indicating an alarm.

Voltage for operating the various circuits of this embodiment is derived from a conventional power supply circuit 137 including a full-wave rectifier bridge 139 to which voltage of a level suitable for semiconductor circuitry is provided by a conventional a.c. source *Es*. As in the FIG. 1 embodiment, there may also be provided terminals which are accessible for utilizing a battery to provide operating voltage in the event of a power failure.

Operation of the FIG. 4 circuitry is as follows: The power supply voltage is delivered by means of a lead L10 to receptacle contact 107*q* and by means of a lead L11 to contact 115*b*. Thus, when a key such as key K3 is inserted in receptacle 105, the supply voltage is supplied via conductor 101*q*, common conductor 103, and conductor 101*p* and contact 107*p* to a lead L12 as a signal to operate the latch. This signal or voltage is delivered through a resistor R22 of inhibit circuit 133 to the base of transistor Q24. A capacitor from this base to ground provides a time delay to permit operation of the inhibit function of the circuitry should the key inserted be incorrect.

The voltage on lead L12 is also supplied through a resistor R23 of inhibit circuit 127 as an inhibit signal. Whenever transistor Q20, whose conductivity is controlled by Exclusive-OR gates 117*c*, . . . , 117*n*, is conductive, this inhibit signal is shunted to ground. Operation of these Exclusive-OR gates is such that only if there is a predetermined correspondence between respective ones of the keys, viz., an identical relationship, will all of the outputs from these Exclusive-OR gates be "low." When this is so, the output of NOR gate 125 is "high," causing transistor Q20 to be biased into conduction. Hence, no inhibit signal is delivered to amplifier 131 and thus transistor Q23 is nonconductive. This permits the voltage across capacitor C11 to bias transistor Q24 into conduction, energizing the latch coil 49.

If any one of the circuit paths of the key inserted in receptacle 105 should be incorrect, the Exclusive-OR gate to whose input this circuit path is connected will provide an output signal which is high, causing the output of NOR gate 125 to be low. If this occurs, transistor Q20 will cease to conduct, and an inhibit signal will be delivered through diode D20 to amplifier 131. The latter will provide the amplified inhibit signal to inhibit circuit 133 for inhibiting conduction of transistor Q24 and thus preventing energization of latch coil 49. The inhibit signal will also be delivered to the base of transistor Q25. The resultant conduction of the latter will cause energization of alarm coil 57.

This embodiment can be converted into one which energizes the latch (or other lock means, etc.) only when there is a complementary relationship between respective ones of the circuit paths of the keys. To provide such an embodiment, it is necessary only to provide means for inverting the output signal of each of Exclusive-OR gates 117*c*, . . . , 117*n*. FIG. 5 shows the provision of a plurality of inverters 141*c*, . . . , 141*n* for this purpose which are provided between the output of each of the Exclusive-OR gates and the respective input of NOR gate 125. Alternatively, Exclusive-NOR gates may be used in place of the Exclusive-OR gates shown to provide this inversion function. If such a change is made, i.e., either use of inverters or use of Exclusive-NOR gates, the output of NOR gate 125 will be "high" only if respective ones of the key circuit paths have a complementary relationship.

Figure 6:
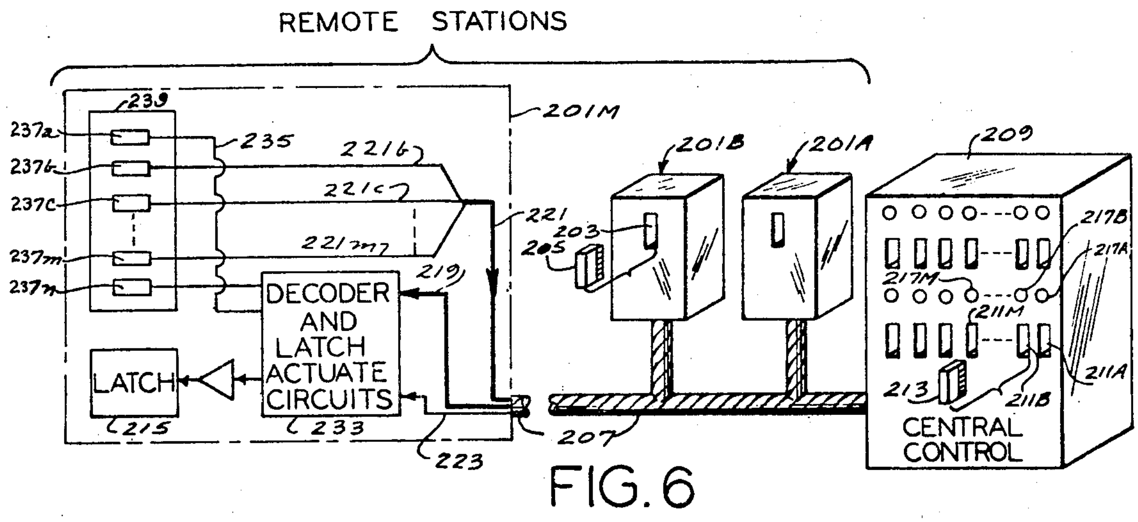
FIG. 6 is a partly pictorial, partly block-diagrammatic representation of a centrally controlled key-actuated security system of the invention having a plurality of remote stations.

A centrally controlled key-actuated electronic security system in accordance with the present invention is pictured in FIG. 6. The system includes a plurality of remote stations 201A, 201B, . . . , 201M, etc., each associated with an individually controlled area such as a hotel room. A typical remote station 201B includes a key receptacle 203 into which a key, such as indicated at 205, of the type described hereinabove, may be inserted in order to gain entrance to the particular controlled area, e.g., a hotel room, by energization of a door latch, for example.

Remote stations 201A, . . . , 201M, etc. are connected via a single cable 207 to a central control station 209 which includes a plurality of key receptacles 211A, 211B, . . . , 211M, each of which is uniquely associated with one of remote stations 201A, . . . , 201M.

Receptacles 211A, . . . , 211M, . . . , are adapted to receive and thus provide electrical interconnection with a plurality of keys, there being a key for each of the remote stations. Such a key is indicated at 213. It is desired that at least some of the keys at central control station 209 have arrangements of circuit paths which arrangements are different from each other.

In general, the system includes circuitry which is operative to compare circuit paths of successive ones of the individual keys at remote stations 201A, . . . , 201M, etc. with respective circuit paths of ones of the plurality of keys in the various receptacles 211*a*, . . . , 211*m*, etc. and to deliver an output signal on cable 207 to the appropriate remote station when there is a predetermined correspondence, i.e., a complementary relationship, between respective ones of the circuit paths which are compared. This output signal may operate a latch such as that designated at 215 in remote station 201M. Central control 209 includes circuitry for sequentially interrogating each of remote stations 201A, . . . , 201M, etc. for making this circuit path comparison. Central control station 209 also includes a plurality of alarm lights 217A, . . . , 217M, etc. which indicate when unauthorized entry has been attempted at any of the remote stations.

As noted above, the present system is intended to employ pairs of keys providing a complementary relationship between respective ones of the circuit paths of the keys. Preferably, the keys used are such that there is a predetermined or constrained number of closed circuit paths on each key. For example, keys may be utilized having twenty circuit paths of which 10 are constrained to provide closed circuits by virtue of interconnection with a common conductor of the key, substantially as previously described. Circuitry of central control station 209 counts the closed circuit paths of keys received at remote stations to determine whether a key has the predetermined or constrained number.

The total number of different possible code combinations or permutations for keys having a preselected number of closed circuit paths is given by $$\frac{n!}{(n-r)\,!r!}$$

where $n$ equals the total number of circuit paths (both open and closed) and $r$ equals the number of closed circuit paths. In the example given, $n$=20 and $r$=10, the total number of possible codes thus being $$\frac{20}{10!10!}=184{,}756$$

Using such keys, the key combination associated with any one of the remote stations may easily be changed to any one of the 184,756 different combinations by replacing the appropriate key at central control station 209.

Figure 7:
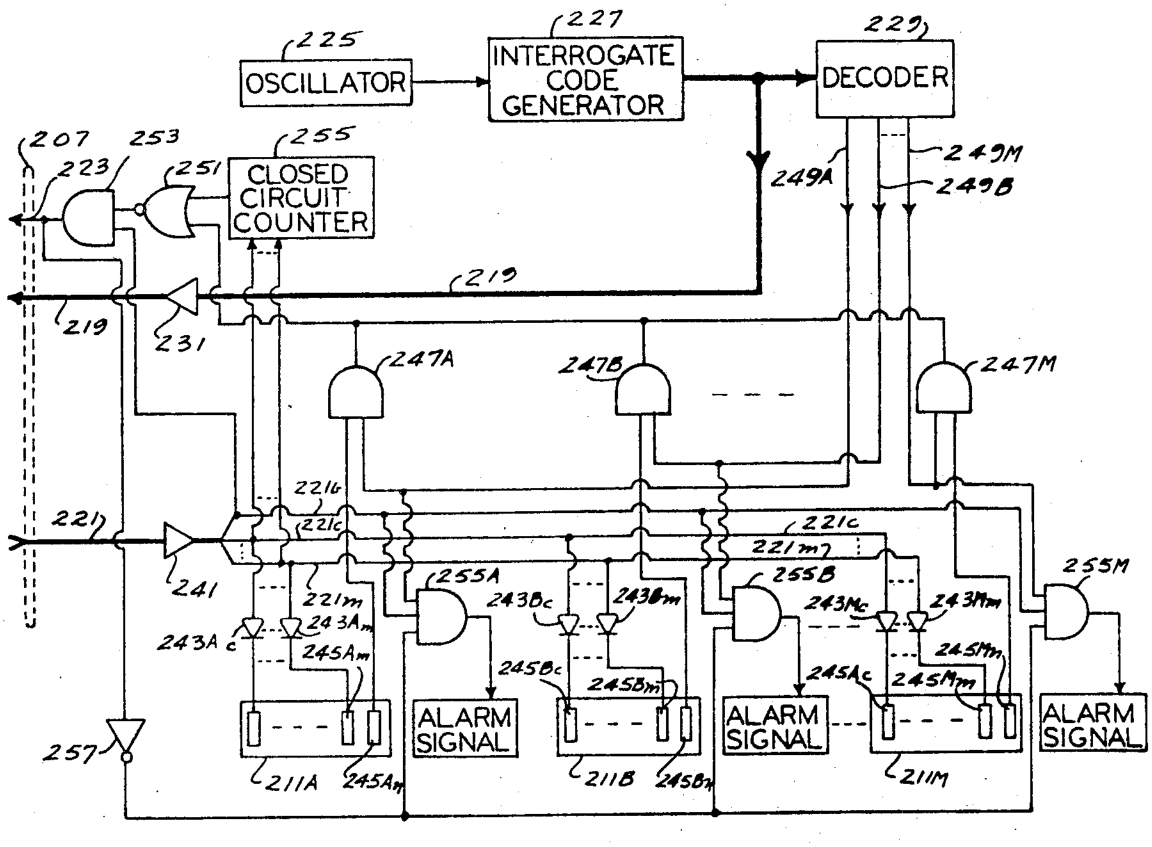
FIG. 7 is a partly schematic, partly block-diagrammatic representation of circuitry of a central control station of the FIG. 6 system.

Circuitry of central control station 209 is shown in FIG. 7. Cable 207 includes a plurality of individual lines interconnected between the central control station and the remote stations. Of these, a set of lines on which signals are sent to the remote stations for interrogation purposes is indicated at 219 and a set of lines on which signals are sent to the central control station from the remote stations for key comparison purposes is indicated at 221. A line over which a latch-actuate signal is sent is designated 223.

Central control station 209 includes an oscillator 225 of a conventional type, constituted for example by a free-running multivibrator, and adapted to supply a train of clock pulses at a frequency of 1 kHz, for example, to an interrogate code generator 227. The latter may comprise simply a conventional binary counter ring of flip-flops each of which may provide one bit of a binary code, the code changing with each successive clock pulse. As those skilled in the art will understand, the code generator should be adapted to step cyclically through a number of codes, i.e., a count range, equal to the number of remote stations 201A, . . . , 201M, etc. interconnected by cable 207 and designating particular ones of these remote stations.

The coded output signal of code generator 227, i.e., the interrogation code, is delivered to a decoder 229, explained hereinbelow, and via the set 219 of lines to decoders of the remote stations. Line drivers represented as an amplifier 231 may be provided to amplify the code signal of the set 219 of code lines. Thus it may be seen that oscillator 225 and code generator 227 together constitute means for sequentially interrogating the remote stations and which operates to cause connection of circuit paths of keys at the remote station to the set of lines or leads 221.

Referring to FIG. 6 for the moment, the set 219 of code lines is shown, at remote station 201M, as being interconnected with decoder and latch-actuate circuits indicated at 233. There a binary decoder of the type known to those skilled in the art is adapted to respond to a particular binary code address delivered on lines 219 and to provide a voltage on a lead 235. In this sense, the remote stations are sequentially interrogated, each remote station having such a decoder responding only to a particular binary code associated with that remote station. The potential on lead 235 is delivered to a contact 237*a* of a plurality of such contacts 237*a*, 237*b*, . . . , 237*n* of a key receptacle 239. Contact 237*a* is adapted to provide an inserted key with this voltage for energizing closed circuit paths of the key via the common conductor thereof, substantially as described hereinbefore in connection with the FIG. 1 and FIG. 4 embodiments. Of these contacts, one contact 237*n* is adapted to provide via a lead 235 a potential, when a key is inserted, for permitting operation of the latch, again substantially as described in connection with the FIG. 1 and FIG. 4 embodiments. The remaining contacts 237*b*, . . . , 237*m* provide interconnection with those circuit paths of a key which define the particular coding of the key.

Thus, if a key is inserted in receptacle 239, whenever the decoder of circuitry 233 responds to the binary address code associated with remote station 201M, a voltage will be delivered by lead 235 and will appear on those of contacts 237*b*, . . . , 237*m* which are interconnected with closed circuit paths of the key. Lines 221, more specifically 221*b*, . . . , 221*m*, there being one such line or lead for each circuit path of a key interconnected at a remote station, are connected with contacts 237*b*, . . . , 237*m*. A signal characteristic of the circuit path coding of the key will therefore be transmitted to central control station 209 whenever remote station 201M is interrogated by code generator 227.

Central control station 209 may include line receivers for amplifying the signal on lines 221 and such is represented as an amplifier 241. Of lines 221, those designated 221*c*, . . . , 221*m* are each connected through a respective isolation diode to a respective contact of each of key receptacles 211A, 211B, . . . , 211M, et cetera. As to receptacle 211A, isolation diodes 243A*c*, . . . , 243A*m* connect lines 221*c*, . . . , 221*m* to respective receptacle contacts 245A*c*, . . . , 245A*m*. Similar isolation diodes and receptacle contacts are designated as to receptacles 211B and 211M as being representative of the remaining receptacles of the central control station. Each of the receptacles has a further contact 245A*n*, 245B*n*, . . . , 245M*n*, etc., for providing interconnection with common conductors of the keys in the receptacles. Each of these latter contacts is connected to provide an input signal to a respective AND gate 247A, 247B, . . . , 247M, et cetera. Another input to each of these AND gates is provided from decoder 229.

Decoder 229, like the decoders of the individual remote stations, may comprise a conventional binary decoder of a type known to those skilled in the art which is operative to provide an output signal on one of a plurality of output leads 249A, 249B, . . . , 249M according to remote station interrogation code, i.e., according to the particular remote station interrogated. Thus an output signal will be provided on lead 249A whenever remote station 201A is interrogated, for example. Each of outputs 249A, . . . , 249M is provided as another input to a respective one of AND gates 247A, . . . , 247M.

Assuming that there are keys in receptacles 211A, . . . , 211M, what happens when a key is inserted in the receptacle of one of remote stations 201A, . . . , 201M is as follows: Interrogation of the remote station delivers a "key-inserted" or first control signal on line 221*b* and delivers the "code" of the key inserted at the remote station via lines 221*c*–221*m*, etc., to the appropriate receptacle 211M, taking remote station 201M as being the one interrogated. If circuit paths of the key received at remote station 201M have a predetermined correspondence, i.e., a complementary relationship, no voltage will appear on contact 245M*n*. Thus, although a signal is delivered to one input of AND gate 247M by lead 249M, one input thereof is low and the output from this AND gate will not be high. The output terminals of AND gates 247A, . . . , 247M are tied together to provide one of two inputs to a NOR gate 251. The output of the latter will be high as long as neither of the inputs thereto is high. This high output from NOR gate 251 is delivered as one of two inputs to another AND gate 253, the other input thereto being provided by line 221*b* from the remote stations.

Another input to NOR gate 251 is provided by a closed circuit counter 255. Lines 221*c*, . . . , 221*m* are provided as inputs thereto. Counter 255 may be a conventional digital-to-analog converter known to those skilled in the art. Its purpose is to prevent operation of the latch at a remote station through the use there of a key having less than a predetermined number of closed circuit paths, e.g., ten closed circuits of a total of 20 open and closed circuit paths. Counter 255 is adapted to deliver an output signal providing an input to NOR gate 251 if there is less than the predetermined number of closed circuit paths.

Assuming that there is not less than the required number of closed circuits on the received key, insertion of the correct key will thus cause no input to NOR gate 251 to be high. Hence its output will be high. Thus NOR gate 251 and AND gates 247A, . . . , 247M may be seen to constitute first logic gate means operative to provide a second control signal when the compared keys have respective circuit paths having a predetermined complementary relationship. With both inputs to AND gate 253 therefore high, a high output therefrom will result. Thus AND gate 253 provides further logic gate means responsive to the above-described first and second control signals for delivering an output signal when said control signals are concurrently present. This output signal is transmitted as a latch-actuate signal by amplifier 231 and line 223. This signal is then sensed by the latch-actuate circuitry 233 at the remote station interrogated, e.g., 201M, resulting in operation of the latch at the remote station.

Should the key received at a remote station have closed circuits in improper positions, i.e., the key of the remote station does not provide the predetermined correspondence, both input terminals to one of AND gates 247A, . . . , 247M will be supplied with input signals, i.e., will be high, causing the output of NOR gate 251 to become low (in effect inhibiting an output signal therefrom) and thus preventing delivery of a latch-actuate signal. The same is true if closed circuit counter 255 detects less than the constrained or predetermined number of closed circuits.

Associated with each of receptacles 211A, . . . , 211M is an alarm signal which may comprise simply the alarm indicator lamps 217A, . . . , 217M shown in FIG. 6. Each of the alarm signals, which serve to indicate when an attempt has been made to utilize an incorrect key at one of the remote stations, is driven by the output from a respective AND gate 255A, . . . , 255M. Each of the latter has three inputs, one of which is a respective output lead 249A, . . . , 249M from decoder 229, another of which is provided by line 221b from the remote stations, and another of which is derived from the inverted output of AND gate 253, i.e., the inverted latch-actuate signal, an inverter 257 being provided for this purpose. If an incorrect key is inserted in a remote station receptacle, as that particular remote station is interrogated, a signal will be present on line 221*b*. An appropriate signal will be delivered via one of leads 249A, . . . , 249M from decoder 229, and, there being no latch-actuate signal, inverter 257 will provide another input which is high to the appropriate one of AND gates 255A, . . . , 255M. Its inputs all being high, the AND gate will provide an output which is high, causing an alarm signal to be given, indicating that a key interconnected at a remote station fails to provide the predetermined complementary circuit path correspondence.

Figure 8:
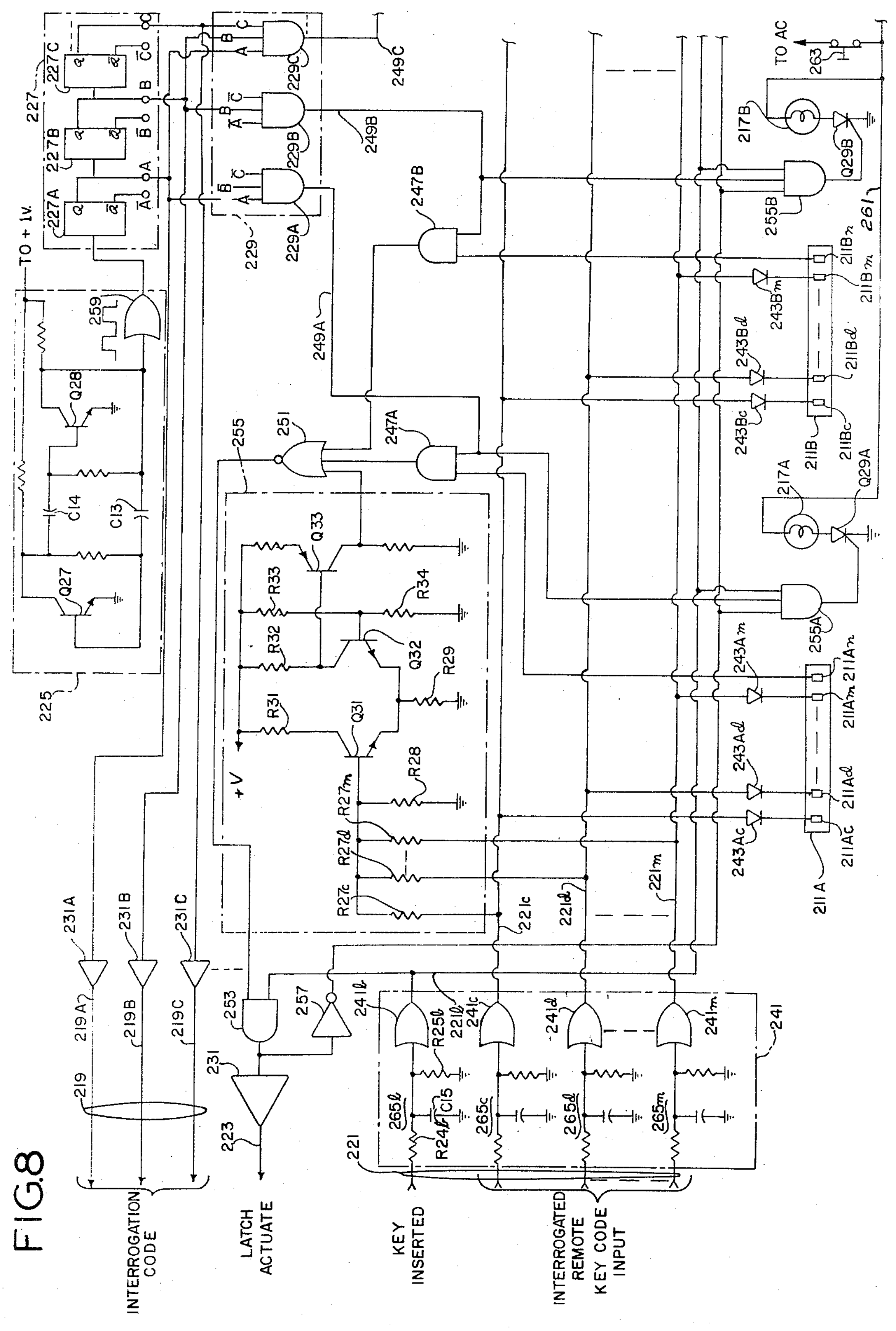
FIG. 8 is a detailed schematic circuit diagram of circuitry of the central control station of FIG. 7.

Referring now to FIG. 8, oscillator 225 includes a pair of NPN transistors Q27 and Q28 whose bases are cross-coupled to the connector of the opposite transistor through respective capacitors C13 and C14 to provide an astable multivibrator having a pulsed output signal of a frequency of 1 kHz, as noted, and which is delivered by a buffer or logic OR-type gate 259 to code generator 227.

Code generator 227 comprises a binary ripple counter having a plurality of toggle flip-flops 227A, 227B, 227C, et cetera. Each such flip-flop constitutes a binary divide-by-two stage and each has its "Q" output connected to provide a toggle input to the succeeding flip-flop. Thus the "Q" and "$\overline{Q}$" outputs of the several stages define a binary code which changes with each count as the counter is advanced through its range of counts by successive pulses from oscillator 225. The "Q" and "$\overline{Q}$" outputs of the various stages are respectively designated A, $\overline{A}$; B, $\overline{B}$; C, $\overline{C}$; et cetera. The number of flip-flops 227A, etc., is sufficient to provide a unique binary code address for each of the remote stations. The "Q" output of each flip-flop, i.e., A, B, C, etc., is delivered as a binary coded signal constituting an interrogation code to the several remote stations, by respective lines 219A, 219B, 219C. There is a respective line driver or amplifier 231A, 231B, etc., for each of lines 219.

Decoder 229 comprises a plurality of logic AND gates 229A, 229B, 229C, etc., corresponding in number to flip-flops 227A, etc., and each having a plurality of inputs each connected to either the "Q" or "$\overline{Q}$" output of one flip-flop. For example, AND gate 229A has inputs A, $\overline{B}$, $\overline{C}$, while AND gate 229B has inputs $\overline{A}$, B, $\overline{C}$, and so forth for each AND gate. Each such AND gate is adapted to have an output which is "-high" (in effect providing an output signal) when all of the inputs thereto are "high." Thus each AND gate provides an output signal in response to a particular interrogation code address corresponding to one of the remote stations for the purpose of determining which remote station is being interrogated. The output terminals of AND gates 229A, 229B, etc., are respectively connected via leads 249A, 249B, etc., to one input terminal each of AND gatrs 247A, 247B, etc., as indicated, and also to one input terminal each of AND gates 255A, 255B, et cetera.

The output terminal of each AND gate 255A, 255B, etc., is connected to the triggering or gate electrode of a respective silicon controlled rectifier or so-called SCR. These SCR's, which generically may be referred to as triggerable semiconductor current switching devices, are designated Q29A, Q29B, et cetera. Each such SCR has its cathode and anode connected in series with a respective one of alarm lights 217A, 217B, etc. (each of which may be of an incandescent type lamp as shown) between a circuit lead 261 and ground. Lead 261 is provided with a suitable a.c. voltage through the normally-closed contacts of a pushbutton reset switch 263. Each such combination of an SCR and an alarm light constitutes an alarm signal so-designated in FIG. 7. An output signal from one of AND gates 255A, etc., will cause triggering of the connected SCR Q29A, etc., to energize light 217A, etc., which will then remain illuminated until extinguished by depressing reset switch 263.

Amplifier 241 associated with lines 221 in FIG. 7 is seen in FIG. 8 to constitute a plurality of line receivers constituted by respective logic OR-type gates 241*b*, 241*c*, etc., there being one such gate in a respective one of lines 221*b*, 221*c*, et cetera. Associated with each gate 241*b*, etc., is a respective line noise filter 265*b*, 265*c*, etc., each comprising a resistor in the line and a capacitor and resistor connected in parallel from the logic gate input to ground. For example, line noise filter 265*b* includes a line resistor R24*b*, and a capacitor C15*b* in parallel with a further resistor R25*b*.

Closed circuit counter 255 is shown in FIG. 8 as comprising a digital-to-analog resistor network including a plurality of resistors R27*c*, R27*d*, . . . , R27*m*, each connected between a respective one of lines 221*c*, etc., and the base of an NPN transistor Q31. A further resistor R28 is connected between the base of Q31 and ground. Transistor Q31 and a further NPN transistor Q32 have their emitters connected through respective resistors R31 and R32 to a positive supply potential +V. The base of Q32 is biased to a constant potential by a voltage divider, including resistors R33 and R34 thus these two transistors constitute a differential amplifier. A PNP transistor Q33 has its base interconnected with the collector of transistor Q32 and its collector connected to one input terminal of NOR gate 251. If a sufficient number of leads 221*c*, etc., have a voltage thereon caused by closed circuit paths of a key interconnected at a remote station, then there will be a sufficient voltage developed across resistor R28 to cause transistor Q3 to be biased into cutoff, resulting in a quite "low" voltage at the input terminal of NOR gate 251 connected with the collector of Q33. As a result, the output of NOR gate 251 will be "high" in the absence of a "high" input signal to any other input terminals thereof. Hence the above-described circuitry operates to count the number of contacts of a remote key. If the number is less than the required or constrained number, an input signal is provided to NOR gate 251.

As an alternative arrangement to the above, closed contact counter 255 may instead comprise a digital parallel-to-serial converter, a counter responsive to the serial output of the converter, and a logic gate means such as an AND gate, responsive to a predetermined correct count in the counter. The mechanics of such an arrangement will be determinable to those skilled in the design of computer logic circuitry.

Figure 9:
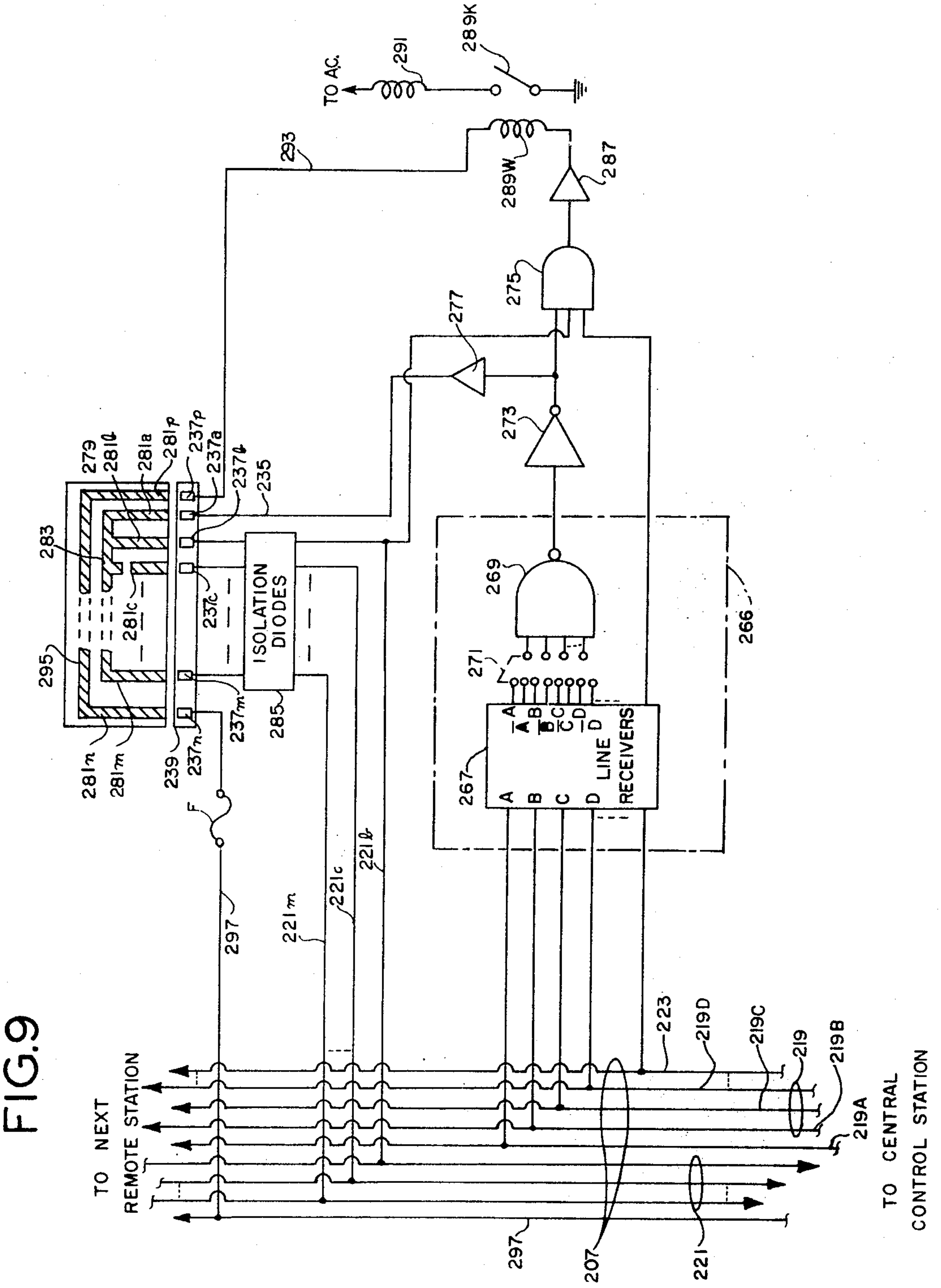
FIG. 9 is a block diagram of circuitry of a remote station which can be used with the control station of FIG. 8.

Circuitry of a typical remote station such as station 201M is shown in FIG. 9 and includes a decoder 266 including a plurality of line receivers 267 having inputs designated A, B, C, D, etc., to which are respectively connected lines 219A, 219B, 219C, 219D, etc., of cable 207. Line receivers 267 provide the signals A, $\overline{A}$; B, $\overline{B}$; etc., of the binary interrogation code. A logic NAND gate 269 has a plurality of input terminals which are connected by jumper levels to the various line receiver outputs A, $\overline{A}$; B, $\overline{B}$, etc., in accordance with a preselected binary code address of the particular remote station. For example, the code address of station 201M may be A $\overline{B}$ $\overline{C}$ $\overline{D}$ and those line receiver outputs are thus jumper-connected to input terminals of NAND gate 269. One such jumper connection is designated 271. The output of NAND gate 269 is therefore ordinarily "high" until the preselected code address of the remote station is delivered via lines 219 at which time the output of this NAND drops or becomes "low." An inverter amplifier 273 has its input terminal connected to the output terminal of NAND gate 269. Accordingly, the output of inverter 273 is "high" when the input thereto is "low." Inverter 273 thereby supplies, in effect, an output signal when the preselected code address of the remote station is present on lines 219.

The output terminal of inverter 273 is connected to one of three input terminals of an AND gate 275. Another input terminal of gate 275 is adapted to be provided with the previously-described latch actuate signal on line 223. It may be noted that one of line receivers 267 is connected between line 223 and gate 275 for this purpose.

The output terminal of inverter 273 is also connected to an amplifier 277 whose output terminal is connected to receptacle contact 237*a* for the purpose of energizing closed circuit paths of a key 279 when received by key receptacle 239. Key 279 may be seen to include a plurality of conductors or circuit paths 281*a*, 281*b*, . . . , 281*m*, etc., some of which are closed circuits and the others of which are open circuits with respect to a common conductor 283, thereby defining a binary code combination or pattern of closed and open circuits, all as explained previously. The pattern or permutation of the remote keys changes from one remote station to the next, as previously noted, there being a key at the central control station corresponding to each such remote key. In the present system embodiment, the respective circuit paths of each such pair of keys have a complementary relationship. I. e., for each closed circuit path of a remote key, the corresponding control station key has an open circuit.

Each of the conductors 281*c*–281*m* may provide either a closed or open circuit, according to a preselected binary pattern, as between its respective receptacle contact 237*c*–237*m* and common conductor 283, but conductors 281*a* and 281*b* always provide closed circuits. Conductor 281*a* is closed to provide a connection between receptacle contact 237*a* and common conductor 283. Accordingly, when the code address of the remote station is present on lines 219 and interrogation of the remote station thereby takes place, the resultant output signal from inverter 273, as amplified by amplifier 277, is supplied via contact 237*a* and conductor 281*a* to common conductor 283. The voltage thereby applied to common conductor is supplied by those of conductors 281*b*–281*m* which are closed, but not those which are open, via receptacle contacts 237*b*–*237m* and through respective isolation diodes 285 to lines 221*b*–221*m*. In this way, the particular binary "code" of key 279 is "transmitted" over cable 207 to the central control station for comparison with the "code" of the corresponding key at the central control.

It should be observed that since conductor 281*b* is always a closed path, the voltage applied thereby to line 221*b* constitutes a "key inserted" signal. This signal is utilized to permit gating operation of AND gate 275 and, for this purpose, line 221*b* is connected by a circuit lead to the third input terminal of gate 275, as illustrated. If the comparison of the coding of the corresponding remote and central keys shows the correct or predetermined correspondence, e.g., a complementary relationship between conductor paths of the two keys, a "latch actuate" signal is transmitted from the central station to the remote station over line 223. This signal is delivered by the appropriate one of line receivers 267 as a gating signal to AND gate 275, whose output thereby becomes "high," in effect supplying an output signal. This latter signal is amplified by an amplifier 287 to cause energization of a relay winding 289W.

A set of normally open contacts 289K controlled by winding 289W is connected in series with the winding 291 of a latch release solenoid between a suitable a.c. power source and ground. When closed by energization of winding 289W, contacts 289K energize solenoid winding 291 thereby permitting opening of a door or for signalling or the like. Power for energizing relay winding 289W is provided via a circuit lead 293 connecting one side of winding 289W to a terminal 237*p* of receptacle 237. Key 279 includes additional conductors which are adapted to provide supply voltage connections, viz., a further pair of conductors 281*p* and 281*n* which are connected together by a further conductor 295 extending transversely across key 279, as illustrated. Each remote key includes such conductors 281*p*, 281*n* and 295 in addition to the closed and open-circuit conductors defining the key code. Cable 207 preferably includes an extra line 297 providing a suitable low-voltage d.c. supply potential commonly to each of the remote stations. Line 297 is connected to receptacle terminal 237*n* so that, when key 279 is inserted in receptacle 237, this d.c. supply potential is supplied via lead 293 and acts to maintain relay winding 289W in its energized state, once energized by an output from amplifier 287, until key 279 is removed from receptacle 237. In this way, energization of solenoid winding 291 is continued until the key is removed from the receptacle. In a hotel system, this permits a hotel guest, for example, to first open the unlatched door without being rushed and then remove his key. This d.c. supply voltage is preferably used also for powering the logic and semiconductor circuitry of the remote station. There is a fuse F in line 297 at the remote station.

Figure 10:
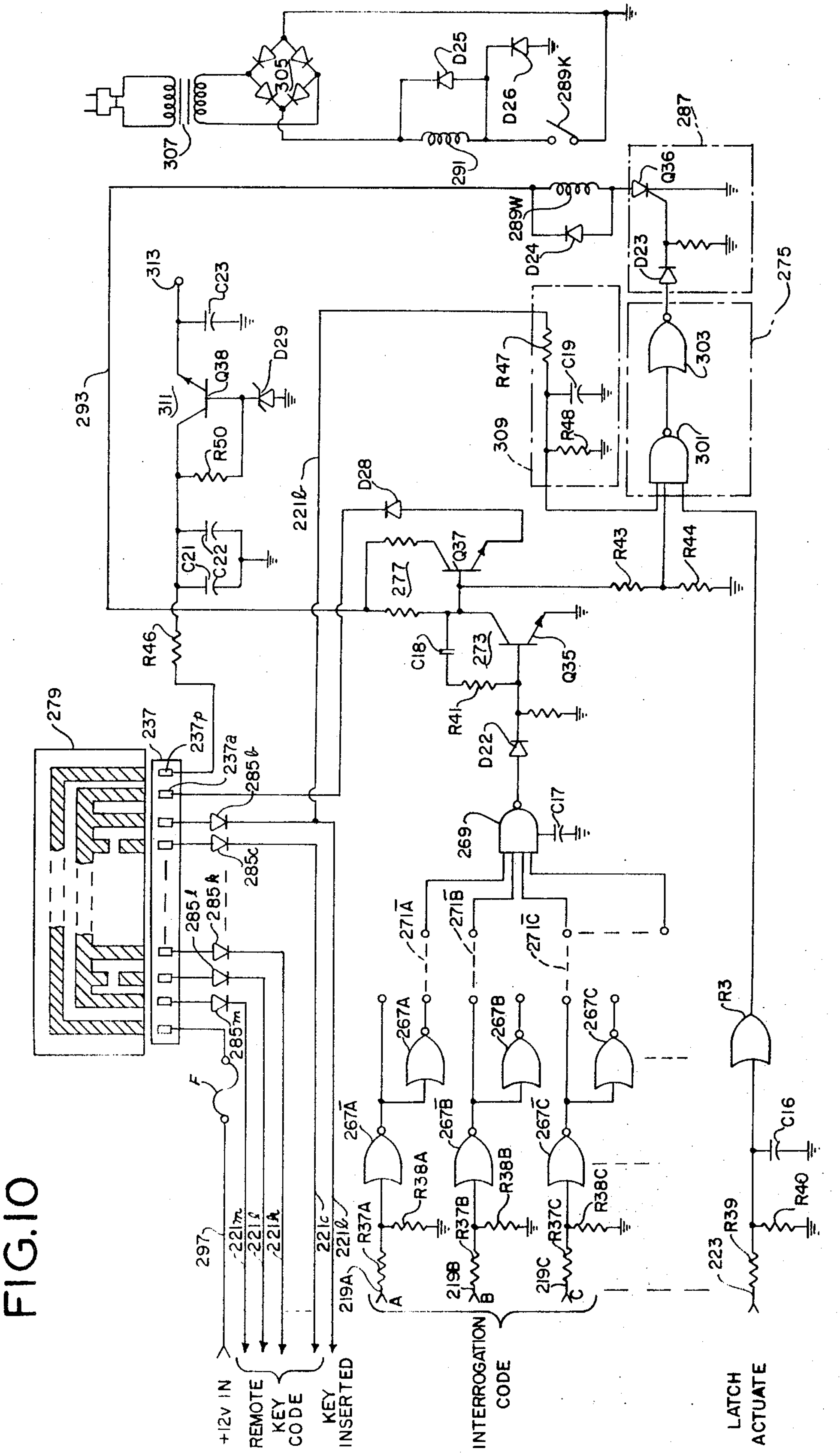
FIG. 10 is a detailed schematic circuit diagram of the circuitry of FIG. 9.

Referring to FIG. 10, showing the FIG. 9 remote station circuitry in detailed schematic form, line receivers 267 of FIG. 9 are constituted by a respective plurality of logic OR-type inverter gates 267$\overline{A}$, 267$\overline{B}$, 267$\overline{C}$, etc. each having an input terminal connected by a respective resistor R37A, R37B, R37C, etc. to a respective one of lines 219A, 219B, 219C, et cetera. Respective resistors R38A, R38B, R38C, etc., are respectively connected between the inputs of inverter gates 267$\overline{A}$, etc., and ground. The output of each such inverter gate 267$\overline{A}$ etc., provides the inverted binary interrogation code digit associated with the respective line, viz., $\overline{A}$, $\overline{B}$, $\overline{C}$, et cetera. Connected to the output terminal of each such inverter gate 267$\overline{A}$, etc., is another inverter gate of the same type. Such gates are designated 267A, 267B, 267C, et cetera. By inverting the respective binary digits $\overline{A}$, $\overline{B}$, $\overline{C}$. etc., produced by gates 267$\overline{A}$, etc., gates 267A, etc., provide noninverted binary interrogation code digits A, B, C, and so forth. A further logic OR-type gate 299 is connected through a resistor R39 to line 233 and constitutes a line receiver for line 233 carrying the latch actuate signal. A resistor R40 and a noise-filtering capacitor C16 are parallel-connected between the input terminal of gate 299 and ground.

Logic NAND gate 269 includes a plurality of input terminals. Three such terminals are representatively illustrated as being respectively connected by jumper leads 271A, 271$\overline{B}$ and 271$\overline{C}$ to the outputs of inverter gates 267A, 267$\overline{B}$ and 267$\overline{C}$. The NAND gate 269 is conventionally provided with a noise-filtering capacitor C17.

Amplifier 273 includes an NPN transistor Q35 connected in common-emitter configuration. Its emitter is grounded and its base is connected through a diode D22 to the output terminal of NAND gate 269. A capacitor C18 and resistor R41 are series-connected between the collector and base. The signal at the collector is opposite in phase to the signal applied to the base, and thus this is an inverter amplifier stage. A voltage divider including resistors R43 and R44 is connected between the collector of Q35 and ground and the junction of these two resistors thus supplies the reduced output signal of amplifier 273 to an input terminal of a logic NAND gate 301. Gate 301 is connected in turn to a logic NOR-type gate 303 so that gates 301 and 303 together constitute AND gate 275 of FIG. 9.

Amplifier 287 is constituted by an SCR designated Q36 whose cathode and anode terminals are connected in a series circuit with relay winding 289W and whose triggering or gate electrode is connected through a diode D23 to the output terminal of inverter gate 303. A transient suppression diode D24 is connected across winding 289W. The top of winding 289W is connected by means of lead 293 through a current-limiting resistor R46 to receptacle terminal 237*p*. Accordingly, when inputs signals are provided to each of the input terminals of AND gate 301, inverter gate 303 will supply an output signal triggering SCR Q36 and thereby energizing relay winding 289W. The SCR (and thus also winding 289W) remains energized until key 279 is removed from receptacle 237.

When relay winding 289W is energized, contacts 289K close. These contacts are connected in a series with latch solenoid winding 291 in a circuit across a full-wave diode rectifier bridge 305. The latter is supplied with a.c. voltage, e.g., 6.3 v. a.c., by a step-down transformer 307. Thus, closing of contacts 289K energizes solenoid winding 291 for unlatching operation of the latch. This circuit also includes transient suppression diodes D25 and D26 connected across winding 291 and contacts 289K, respectively.

It may be noted that the connection from line 221*b* to one input terminal of NAND gate 301 includes a line noise filter 309 including a line resistor R47, and a capacitor C19 and further resistor R48 both connected between the gate input side of R47 and ground.

Amplifier 277 may be seen to constitute simply an NPN transistor Q37 whose base is connected to the collector of Q35 and whose emitter is connected through a diode D28 to receptacle contact 237*a*.

One other feature of the remote station is the provision of a power supply circuit 311 including an NPN transistor Q38 whose base is connected through resistor R46 to receptacle contact 237*p*. A pair of filtering capacitors C21 and C22 are connected between the collector of Q38 and ground. A zener diode D29 connected between the base of this transistor and ground and a biasing resistor R50 connected between Q38's collector and base electrodes cause a regulated voltage to appear at the emitter of this transistor which voltage is applied across a filtering capacitor C23. This voltage, e.g., 5 v. d.c., is available at a terminal 313 and is preferably used for supplying operating power for the various logic gates of the remote stations.

Operation of the security system utilizing the circuitry of FIGS. 8 and 10 is generally as follows: Interrogation of the several remote stations occurs continuously, since the binary signals in lines 219 constitute a continuously changing binary code address. If a key is inserted at one of the remote stations, power is supplied to circuitry of that remote station by conductors 281*n*, 295 and 281*p* of that key and circuitry of that remote station thereby becomes operative. When the decoder of that remote station responds to the particular or preselected binary code address for that remote station, amplifier 277 supplies voltage to the conductors of the inserted remote key. As a result, the particular coding of that key is transmitted, in effect, over lines 221 to the central control station. The central station effectively operates to compare the remote key coding with that of the key at the central station corresponding with the remote key. This pair of keys may be said to constitute first and second keys each constituted by a plurality of closed and open circuits. Comparison of the respective ones of the circuit paths (i.e., conductors) of these keys is effectively made by the following circuitry (see FIG. 8): AND gate 253 and amplifier 231, together operating to provide a "latch actuate" control signal; AND gates 247A, etc., as well as NOR gate 251, which together constitute an inhibit circuit interconnected with AND gate 253 and operative to inhibit the latch actuate signal in response to an output signal from any of AND gates 247A, etc.; and the circuit connections, including receptacles 243A, etc., and isolation diodes 243A, etc., which interconnect individual ones of the circuit paths of the two compared keys with the inputs of AND gates 247A, etc., to cause absence of an output signal from the appropriate one of the last-said AND gates if the compared keys have complementary circuit path arrangements, but which causes presence of an output signal therefrom if there is other than this predetermined complementary correspondence. It should be noted that the circuitry of FIGS. 1 and 3 utilized a NAND gate 33 in an equivalent manner as AND gates 247A, etc., with NOR gate 251 of FIGS. 7 and 8.

Accordingly, if there exists the predetermined or "correct" correspondence between respective ones of the key circuit paths compared, the output of NOR gate 251 is "high," providing one input to AND gate 253. The other input to this AND gate is supplied by the "key inserted" signal on line 221*b* via gate 241B.

The above-described comparison having taken place and resulting in a latch actuate signal on line 223, the circuitry of the remote station at which the key (thus determined to be "-correct") has been inserted then operates to cause triggering of SCR Q36, resulting in latch solenoid operation. The door theretofore latched by the solenoid may then be opened. Of course, closing of relay contacts 289K as well as the signal on line 223 may be used for other purposes, as noted previously. The foregoing operation all takes place within the brief interval, e.g., 1 millisecond, during which the particular individual remote station is interrogated.

If, however, there is not a predetermined "correct" correspondence between the compared keys, then the output AND gate 253 will be "low." As a result, inverter 257 will supply an input to each of AND gates 255A, et cetera. Each of these AND gates is also supplied with respective inputs by AND gates 229A, etc., of decoder 229, in accordance with the code address corresponding to the interrogated remote station. Accordingly, there will be an output signal from the one of AND gates 255A associated with the remote station at which an "incorrect" key has been inserted (or where an attempt to defeat the system has been made). The corresponding signal light 247A, etc., will then be energized to indicate the fact of usage of an incorrect or improper key, or "picking" device, at the identified remote station.

Figure 11A:
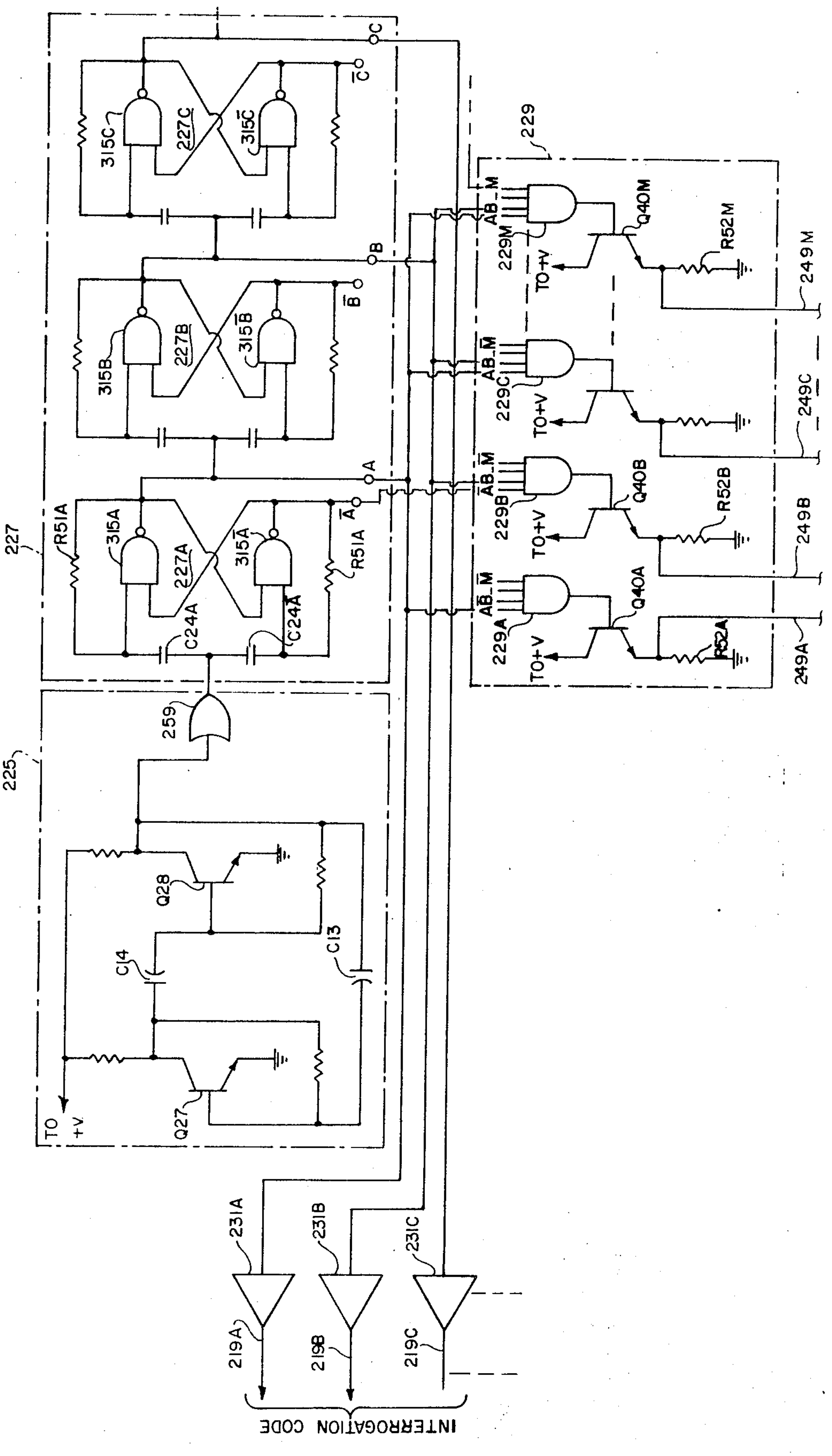
FIGS. 11A and 11B together constitute a detailed schematic circuit diagram of another central control station embodiment, interconnections between the two sheets being designated with Roman numerals.
Figure 11B:
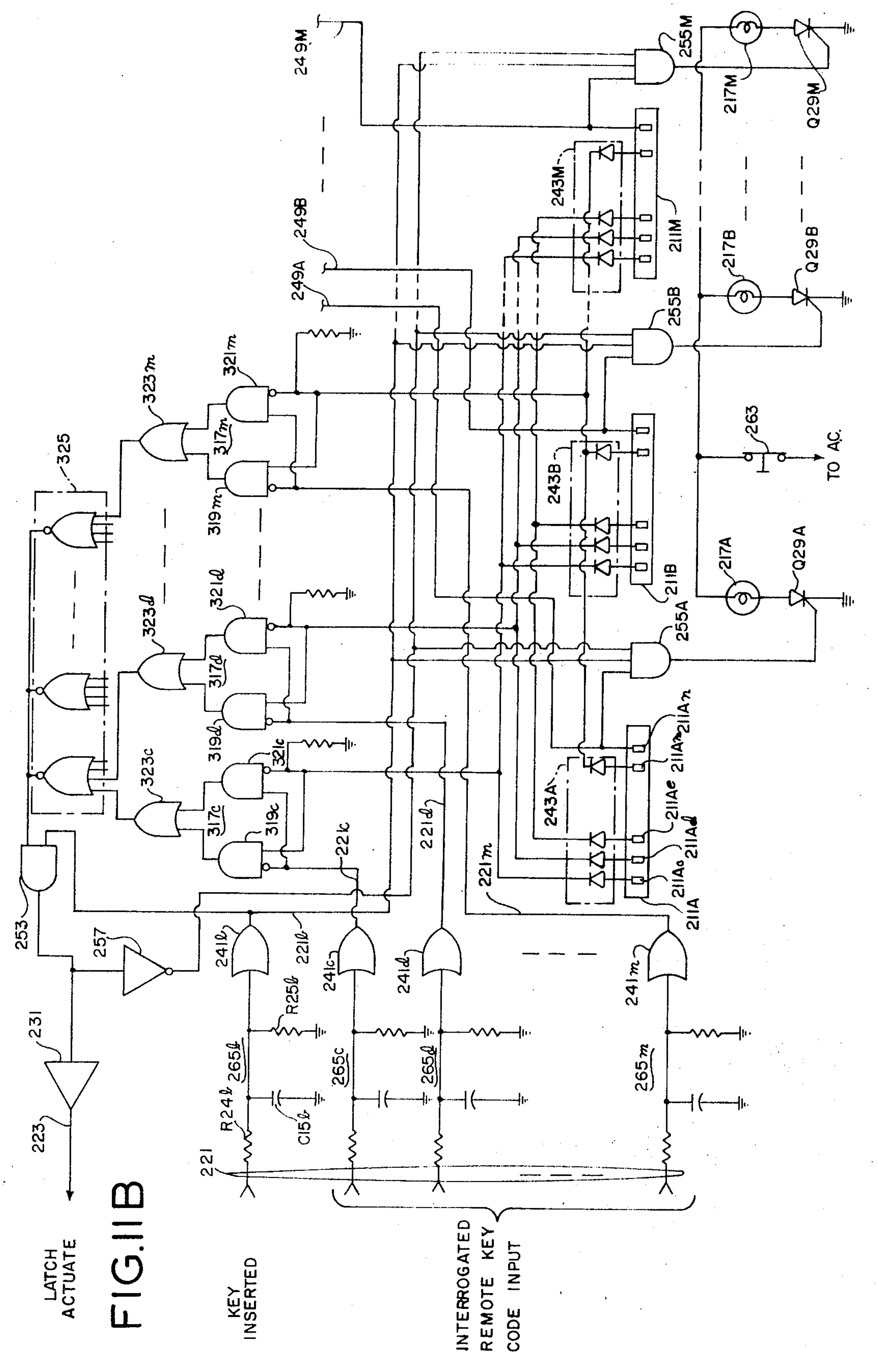

FIGS. 11A and 11B depict circuitry of a central control station of a system of the present invention wherein corresponding keys of the remote stations and central station, i.e., the pairs of compared keys, are adapted to provide an identical relationship between respective ones of the key circuit paths compared. Such is also the case with the circuitry of FIG. 4 and principles of the latter circuit are incorporated in the circuitry of FIGS. 11A and 11B.

Referring first to FIG. 11A, code generator 227 is here shown more specifically and includes flip-flop stages 227A, 227B, 227C, etc., each of which comprises a pair of two-input logic AND gates designated respectively 315A, 315$\bar{A}$; 315B, 315$\bar{B}$; and so forth. As to each stage 227A, etc., each AND gate 315A, 315$\bar{A}$, etc., has its output connected to one of the inputs of the other AND gate of the stage. Taking stage 227A as an example, the input pulses from oscillator 225 are supplied to the other input of each AND gate 315A, 315$\bar{A}$, respectively, through respective capacitors C24A, C24$\bar{A}$. Respective resistors R51A, R51$\bar{A}$ are connected between the latter inputs and the outputs of the gates. Succeeding stages 227B, 227C are identical. Each of the two AND gates 315A, 315$\bar{A}$ of the stages provides at its output one binary digit. For example, gate 315A supplies digit A, gate 315$\bar{B}$ supplies digit $\bar{B}$, and so forth.

Decoder 229 includes individual AND gates 229A, 229B, etc., corresponding to flip-flop stages 227A, 227B, etc., as in FIG. 8, but further includes separate amplifiers with respective NPN transistors Q40A, Q40B, etc., for each AND gate 229A, 229B, et cetera. Each such transistor has its base interconnected with the output of the respective AND gate and includes a respective load resistor R52A, R52B, etc., between its emitter and ground. The amplified decoder output signals are delivered to one input terminal each of AND gates 255A, 255B, etc. (see FIG. 11B), of leads 249A, 249B, etc., which are connected to the respective emitters of transistors Q40A, Q40B, et cetera.

The key circuit comparing means of this embodiment comprises a plurality of Exclusive-OR gates or circuits 317*c*, 317*d*, etc., each having a pair of inputs and a single output. Operation is such that if the two inputs are either "high" or "low," the output will be "low." Taking circuit 317*c* as an example, each such circuit includes a pair of AND gates, e.g., 319*c* and 321*c*, with cross-connected inputs as shown. Each such AND gate has one inverting input which serves as one of the two Exclusive-OR inputs. The outputs of the latter AND gates provide inputs to a two-input OR gate, e.g., 323*c*, whose output provides the Exclusive-OR output. Logic components of succeeding circuits 317*d*, etc., are similarly designated.

One input of each Exclusive-OR circuit is connected with a respective one of lines 221*c*, 221*d*, et cetera. The other input of each Exclusive-OR circuit is connected through a respective one of isolation diodes 243A, etc., to a contact of receptacles 211A, etc., which contact corresponds with the respective one of lines 221*c*, et cetera. Accordingly, the two inputs of each Exclusive-OR circuit are adapted to be connected with respective corresponding circuit paths of a corresponding pair of keys, one key being received, of course, at a remote station and the other being received by one of receptacles 211A, 211B, and so forth.

The outputs of the several Exclusive-OR circuits are connected to the inputs of one or more NOR gates, designated collectively 325, it being apparent that the number of such gates will be determined by the number of Exclusive-OR circuits and hence the number of NOR inputs required.

Operation of the embodiment of FIGS. 11A and 11B is not dissimilar to that of the embodiment of FIG. 8, noting that the remote station described in connection with FIGS. 9 and 10 is used without change in conjunction with the FIG. 11 circuitry. Upon interrogation of a remote station at which a key is inserted, the particular coding of the latter key is effectively transmitted over lines 221*c*, etc., to the central control station. At the same time, decoder 229 delivers a signal on the one of leads 249A, etc., corresponding with the interrogated remote station. Assuming remote station 201A to be the one at which a key is inserted, a signal will be supplied, simultaneously with interrogation of that remote station, over lead 249A to receptacle contact 211A*n*. This causes a voltage to be applied to the common conductor of the key inserted in receptacle 211A. Those individual conductors of the latter key which are closed then deliver that voltage via receptacle contacts 211A*c*–2 11A*m* and via isolation diodes 243A to respective ones of the Exclusive-OR circuits. If respective closed and open conductors of the remote key have identical correspondence with respective closed and open conductors of the key at the central station, then each Exclusive-OR circuit output will be "low," since each such Exclusive-OR circuit will have each of its pair of inputs either "high" (voltages present) or "low" (no voltages present). Hence the outputs of each of the NOR gates 325 will be "high." The key inserted at remote station 201A will have caused a "key inserted" signal on lead 221*b*, supplying one input signal or "high" input to AND gate 253. The "-high" output from NOR gates 325 provides the other input to AND gate 253 and thus a "latch actuate" control signal will be delivered by driver 231 via line 223 to remote station 201A, where operation proceeds as previously described.

However, if the "correct" comparison is not made, i.e., when there is other than the predetermined identical circuit path correspondence, NOR gates 325 will be provided with one or more "high" inputs, and a "low" output (i.e., no output signal) from NOR gates 325 will prevent gating by AND gate 253 and hence act to inhibit the "latch actuate" signal, in the same manner as the FIG. 8 embodiment. Of course, as before, the absence of an output signal (in other words, the presence of a "low" output) by AND gate 253 will cause inverter 257 to supply input signals to AND gates 255A, etc., which are also supplied with the "key inserted signal." Interrogation signals via leads 249A, etc., will then cause an output signal from the one of gates 255A, etc., associated with the interrogated remote station. In the foregoing example, an incorrect key at remote station 201A will result in an output signal from AND gate 255A, resulting in alarm signalling operation by light 247A.

Figure 12:
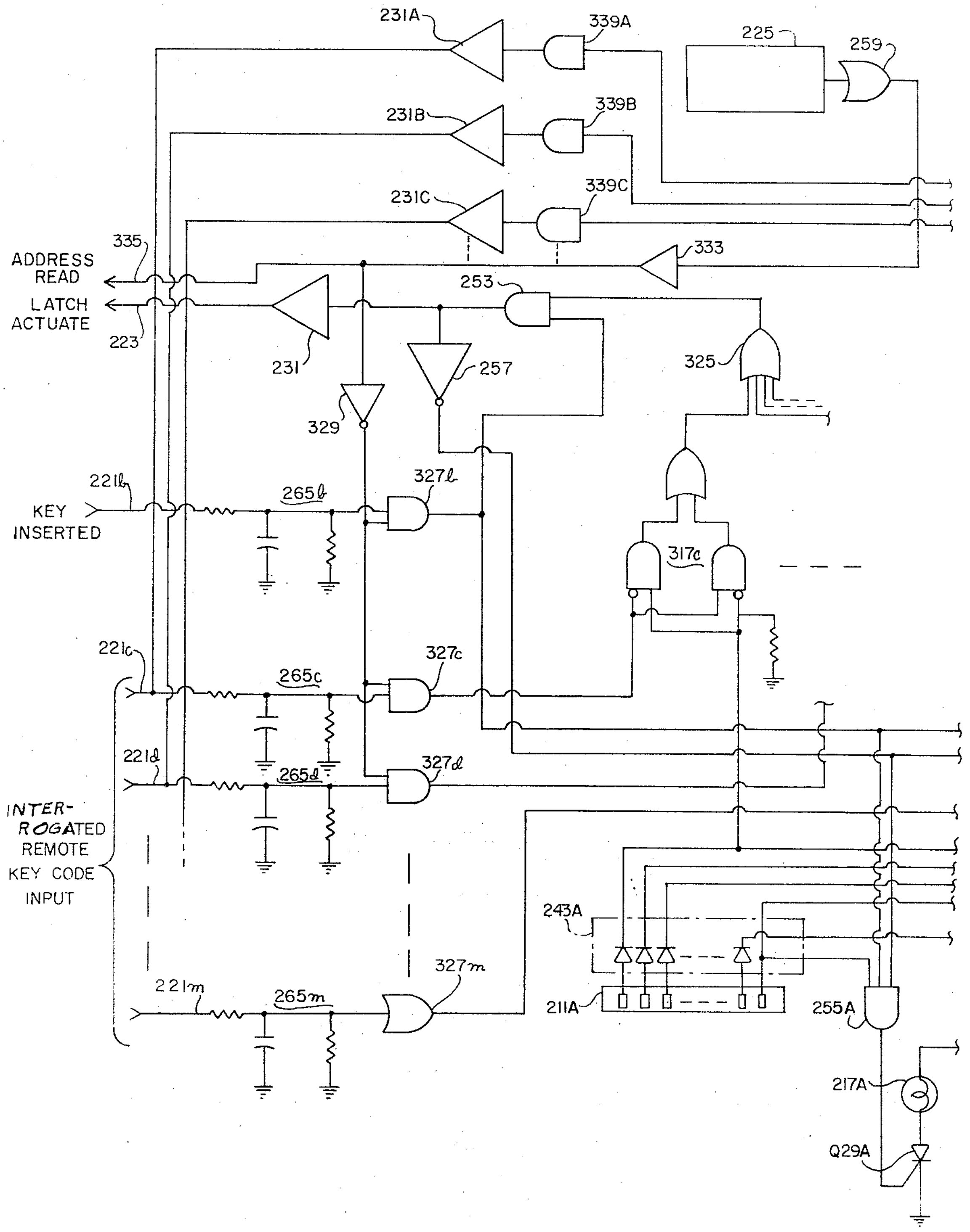
FIG. 12 is a schematic circuit diagram of portions of a central control station embodiment which is a variation of the embodiment shown in FIGS. 11A and 11B.

Illustrated in FIG. 12 are portions of the circuitry of a central control station permitting the same set of leads of lines of the cable connecting the remote stations to be used for both interrogation of the remote stations and transmission of the key codes therefrom to the central station. Certain other portions of this embodiment are identical with portions of FIGS. 11A and 11B and have not therefore, been shown.

Referring now to FIG. 12, the cable interconnecting the remote stations with the central station includes, as in the FIG.

11 embodiment, lines 221*b*, 221*c*, . . . , 221*m*, over which the key codes of keys inserted at remote stations are transmitted to the central station. Line noise filters 265*b*, 265*c*, etc., are provided as before, each such noise filter being connected to one input of a respective two-input AND gate 327*b*, 327*c*, et cetera. These latter AND gates serve as line receivers. However, as in FIG. 11A, line noise filter 265*m* is connected to logic OR-type gate 241*m*, the latter again serving as a line receiver.

AND gates 327*b*, etc., are each adapted to be gated by an output signal from an inverter amplifier 329 whose input is provided with pulses from oscillator 225, via a lead 331 and an amplifier (which may be a logic gate) 333. The amplified output pulses of oscillator 225 are used as clock pulses and are supplied to the several remote stations via a line 335 of the cable connected to the remote stations as an "address read" signal. As will be apparent, inverter amplifier 257 provides an output signal, i.e., its output is "high," except when a clock pulse is applied to its input. Accordingly, AND gates 327*b* may each gate a signal (one "bit" of the remote key code) appearing on leads 221*b*, etc., except when a clock pulse is supplied to inverter 329.

The output terminals of AND gates 327*c*, 327*d*, etc., are connected to respective ones of the Exclusive-OR circuits 317*c*, 317*d*, etc., only one such circuit 317*c* being shown. As in FIG. 11, the outputs from these Exclusive-OR circuits are connected to inputs of one or more OR-gates 335, the output thereof being connected to one input of AND gate 253. The signal on lead 221*b*, as before, serves as a key-inserted signal and is adapted to be gated by AND gate 327*b*. The output terminal of this latter gate is connected to the other input of AND gate 253 and also to one input each of AND gates 255A, 255B, and so forth. Inverter 257 is connected as in FIG. 11. Contacts of key receptacles 211A, etc., are connected through sets of isolation diodes 243A, etc., to the other inputs of the respective Exclusive-OR circuits in the same manner as in FIG. 11.

The output leads from binary ripple counter or code generator 227 (not shown in FIG. 12; see FIG. 11B) are designated 337A, 337B, etc., in FIG. 12. Respective logic AND-type gates 339A, 339B, etc., are connected in these leads to provide buffers. The outputs of these latter gates are respectively connected to the inputs of line drivers or amplifiers 231A, et cetera. Each such amplifier 231A, etc., is connected to a respective one of lines 221*c*, 221*d* and so forth (rather than being connected to separate lines of the cable as in FIG. 11). Accordingly, the binary code addresses of the several remote stations are delivered over lines 221*b*, etc., to the remote stations.

Figure 13:
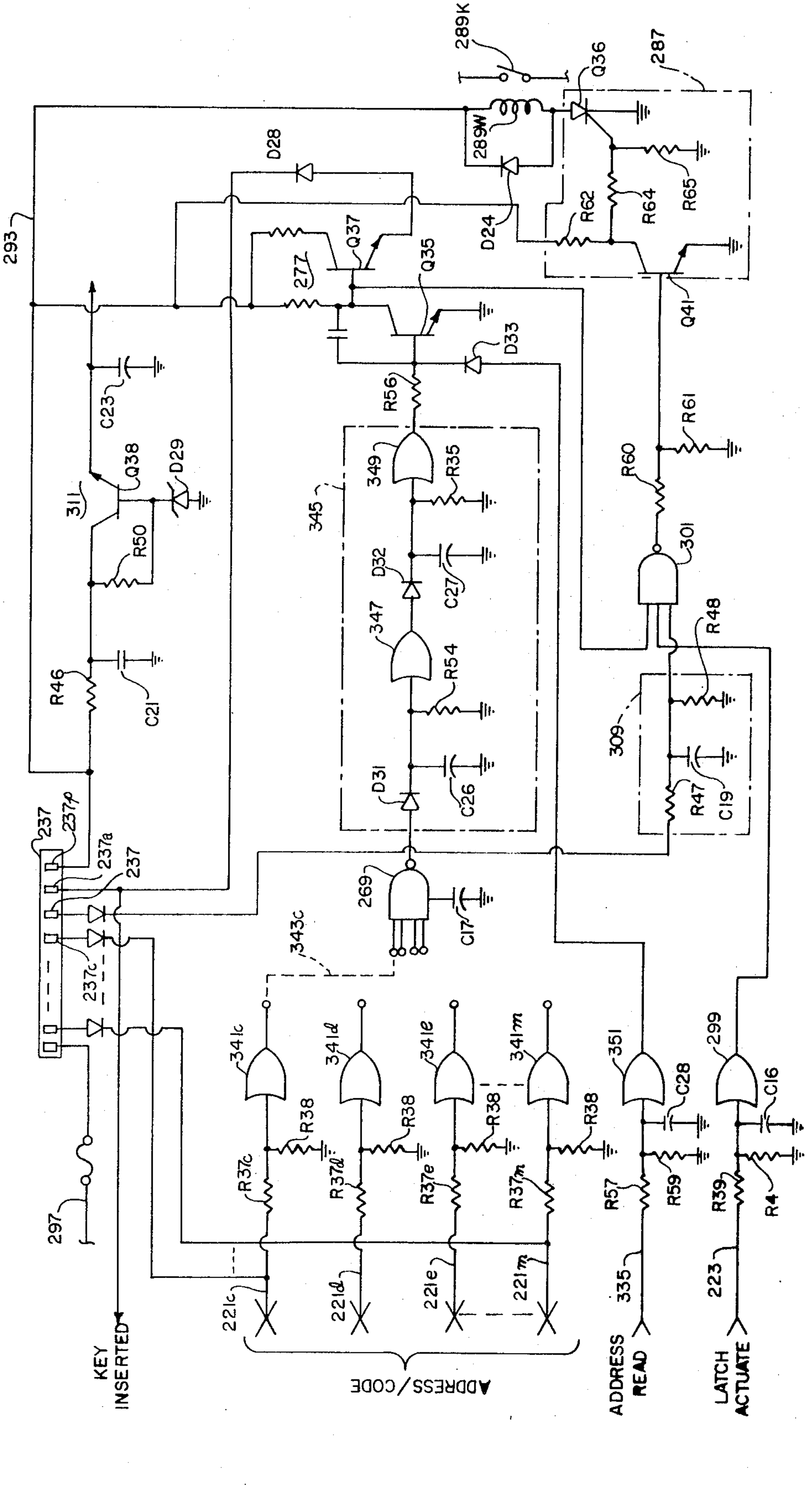
FIG. 13 is a schematic circuit diagram of a remote station which can be used with the embodiment of FIG. 12.

Circuitry of a remote station which can be employed with the central station of FIG. 12 is depicted in FIG. 13. Such a remote station includes portions of the circuitry of the embodiments of FIGS. 9 and 10. The corresponding parts will be apparent.

Logic OR-type gates serving as buffers or line receivers are connected through respective resistors R37*c*, etc., to lines 221*c*, etc., and are designated 341*c*, 341*d*, and so forth. Certain ones of the outputs of these logic gates are adapted to be connected, as with jumper leads, to the respective inputs of NAND gate 269 in accordance with the interrogation code address of the particular remote station. The code may be one of several suitable types, including pure binary. The code address of the remote station may be conveniently changed by using different jumper connections. One such jumper connection is designated 343*a*. The output of NAND gate 269 is "high" (thus supplying an output signal) except when the signals on lines 221*c*, etc., interrogate the particular remote station and thus represent the code address of the remote station, at which time the output of gate 269 becomes "low." Connected to the output of gate 269 is a one-shot multivibrator circuit 345 constituted by a first logic OR-type gate 347 whose input is connected through a diode D31 to the output of gate 269 and a second logic OR-type gate 349 whose input is connected through a diode D32 to the output of gate 347. A capacitor C26 and a resistor R54 are connected between the input of gate 347 and ground. A capacitor C27 and a resistor R55 are similarly interconnected with gate 349.

Multivibrator 345 is adapted to in effect delay the change in potential at the output of NAND gate 269 when the remote station address is received, effectively providing a lengthened output pulse which is delivered through a resistor R56 to the base of transistor Q35. As a result, upon interrogation of the remote station, the signal applied to the base of Q35 will drop after a time period determined by the multivibrator. Hence, multivibrator "remembers" that the remote station has been interrogated. The delay interval is less than the pulse repetition period or period between the successive pulses supplied by oscillator 225 of the central station.

Also connected to the base of transistor Q35 through a diode D33 is the output of another logic OR-type gate 351 whose input is connected through a resistor R57 to line 335 (which delivers the "address read" signal). A capacitor C28 and resistor R59 are connected from this input to ground as a line noise filter. Each time oscillator 225 provides an output pulse (which is delivered by line 335 as the "address read" signal), a pulse is supplied by gate 351 through diode D33 to the base of Q35, driving the latter into saturation, or conductivity. Hence, so long as an "address read" signal is present, operation of multivibrator 345 has no effect on Q35. However, when the "address read" signal then disappears, Q35 is permitted to switch from saturation to cut-off because the output of multivibrator 345 remains low. This renders Q37 conductive thereby to supply through diode D28 to receptacle contact 237*a* a potential which in effect transmits the remote key code over lines 221*c*, etc., to the central station in the same manner as described with regard to FIG. 10.

The key code is gated by AND gates 327*b*, etc., and then compared with that of the corresponding key at the central station, as described previously. If the keys have the predetermined or "correct" correspondence (i.e., corresponding circuit paths of the two keys are identical), a "latch actuate" signal is transmitted over line 223 whose line receiver (gate 299) then delivers this signal to one input of NAND gate 301. The other two inputs thereto are connected as in FIG. 10. I.e., one input signal is provided by the "key inserted" signal present in line 221*b* and another by the voltage appearing at the collector of transistor Q35. The output of NAND gate 301 is "high" (effectively supplying an output signal in effect) until input signals are supplied to each of the three inputs of NAND gate 301. The output of gate 301 is connected to a voltage divider including resistors R60 and R61. Thus an output signal is delivered to amplifier 287 except when these three input signals are delivered to gate 301.

Amplifier 287 is shown in this embodiment to include an additional transistor Q41 whose emitter is grounded. Its collector is biased through a resistor R62 to the supply potential on line 297. Connected between the collector of Q41 and ground is a voltage divider including resistors R64 and R65. The gate of SCR Q36 is connected to the junction of R64 and R65. When the output of gate 301 goes "low" in response to the receiving of the "latch actuate" signal on line 223, transistor Q41 becomes cut-off. A voltage is then developed across resistor R65 causing triggering of SCR Q36 and resultant energization of relay winding 289W. Contacts 289K thereby close for latch energization to cause door unlocking or the like.

From the foregoing, it will be apparent that multivibrator 345 in effect operates as a time delay circuit which together with amplifier 277, upon interrogation, effectively connects the circuit paths of a key inserted in receptacle 237 with lines 221*c*, etc., by supplying voltage to the common conductor of the received key after the multivibrator's delay interval following the interrogation. Amplifier 277 thus operates, as in the embodiment of FIGS. 9 and 10, as means responsive to interrogation of the individual remote station for transmitting the code of the remote key to the central station.

A further reduction in the number of lines or conductors of the cable interconnecting the central control station and the remote stations can be effected through use of parallel-to-serial and serial-to-parallel conversion techniques using shift registers. For example, the interrogation code addresses of the remote stations may be sent in serial binary form over a single line interconnected with each of the remote stations. The code of the remote key of an interrogated remote station, as determined by the circuit pattern of the remote key, may then be transmitted over the same single line to the central station.

As those skilled in the art are aware, logic gates or devices of the type described with regard to the several embodiments of this invention may be replaced by their functional or logical equivalents. E.g., a logic AND gate may be replaced by a NAND gate together with an inverter, and so forth.

Of course, the various circuits and logic devices described herein may advantageously be in the form of monolithic integrated circuits.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A key-actuated electronic security system comprising:

a first key constituted by a plurality of circuit paths in a binary code combination of closed and open circuits;

a second key constituted by a plurality of circuit paths in a binary code combination of closed and open circuits, individual circuit paths of said second key corresponding to individual respective circuit paths of said first key;

means for electrically comparing respective ones of the circuit paths of said first and second keys and operative to deliver an output signal when there is a predetermined correspondence between said respective ones of the circuit paths of said keys; and means responsive to said output signal for indicating said predetermined correspondence between said ones of the circuit paths of said keys;

one of said keys being readily changeable thereby when changed to modify the pattern of closed and open circuits thereof so that there will not be said predetermined correspondence whereby said one key will be inoperative to cause the comparing means to deliver an output signal and whereby a third key constituted by a pattern of closed and open circuits providing a predetermined correspondence between the circuit paths thereof and the circuit paths of the changed key must be utilized to cause the comparing means to deliver an output signal.

2. A key-actuated electronic security system comprising:

keys each constituted by a plurality of circuit paths in a binary code combination of closed and open circuits, individual circuit paths of one of said keys corresponding to individual respective circuit paths of another of said keys;

first means for receiving a first one of said keys and providing electrical interconnection with individual ones of the circuit paths of said first key;

second means for receiving a second one of said keys and providing electrical interconnection with individual ones of the circuit paths of said second key;

means for electrically comparing respective ones of the circuit paths of said keys and operative to deliver an output signal when there is a predetermined correspondence between said respective ones of the circuit paths of said keys; and means responsive to said output signal for indicating said predetermined correspondence between said ones of the circuit paths of said keys.

3. A system as set forth in claim 2 wherein said means for electrically comparing circuit paths is operative to deliver said output signal when said predetermined correspondence between said respective ones of the circuit paths of said keys is constituted by a complementary relationship.

4. A system as set forth in claim 2 wherein said means for electrically comparing circuit paths is operative to deliver said output signal when said predetermined correspondence between said respective ones of the circuit paths of said keys is constituted by an identical relationship.

5. A system as set forth in claim 2 wherein said means responsive to said output signal comprises electrically actuatable lock means for unlocking in response to said output signal.

6. A system as set forth in claim 2 wherein said means for electrically comparing circuit paths comprises;

logic gate means having a plurality of inputs each adapted to be energized by interconnection with an individual closed circuit path of at least one of said keys, said logic gate means delivering an inhibit signal when there is other than said predetermined correspondence between said respective ones of the circuit paths of said keys; and an inhibit circuit interconnected with said logic gate means and responsive to said inhibit signal for inhibiting said output signal when said inhibit signal is delivered by said logic gate means.

7. A system as set forth in claim 6 further comprising an alarm responsive to said inhibit signal for indicating when there is other than said predetermined correspondence.

8. A system as set forth in claim 6, said logic gate means comprising a NAND gate, said inhibit signal being delivered when less than all of said inputs of said NAND gate are energized.

9. A system as set forth in claim 6, said logic gate means comprising a plurality of Exclusive-OR gates each having a pair of inputs, one of said pair of inputs being adapted for interconnection with a circuit path of said first key, the other of said pair being adapted for interconnection with a respective circuit path of said second key; and wherein said means for electrically comparing circuit paths also comprises further logic gate means having a plurality of inputs connected with corresponding outputs of said Exclusive-OR gates and having an output terminal providing said inhibit signal, the delivery of said inhibit signal being determined by whether any of the inputs of said further logic gate means is energized by an output signal from one of said Exclusive-OR gates.

10. A system as set forth in claim 1, wherein said further logic gate means comprises at least one NOR gate whereby said predetermined correspondence between respective ones of the circuit paths of said keys is constituted by an identical relationship.

11. A system as set forth in claim 10, said means for electrically comparing circuit paths further comprising means for inverting the output signal of each of said Exclusive-OR gates whereby said predetermined correspondence between respective ones of the circuit paths of said keys is constituted by a complementary relationship.

12. A system as set forth in claim 6, said keys each having a common conductor electrically connecting in common the closed circuits of the key.

13. A system as set forth in claim 6, each of said first and second means for receiving keys including means for applying a voltage to the common conductor.

14. A system as set forth in claim 13 wherein said means for electrically comparing circuit paths further comprises a matrix interconnected with the first and second key-receiving means and said logic gate means for connecting respective ones of the circuit paths of said keys with respective ones of said inputs.

15. A system as set forth in claim 14 wherein one of the means for applying a voltage to a common conductor is adapted to apply a voltage higher than that of the other of the voltage applying means for applying a voltage to a common conductor, said system further comprising a voltage threshold detector interconnected with said other of the voltage applying means and which is operative to sense the voltage on the common conductor to which voltage is applied by said other voltage applying means and to deliver a further inhibit signal to said inhibit circuit thereby to cause inhibiting of said output signal if the sensed voltage exceeds a threshold value less than said higher voltage but greater than that applied by said other voltage applying means.

16. A key-actuated electronic security system comprising:

first and second keys each constituted by a plurality of circuit paths in a binary code combination of closed and open circuits, individual circuit paths of said second key corresponding to individual respective circuit paths of said first key;

means for electrically comparing respective ones of the circuit paths of said keys, comprising:

means responsive to at least one closed circuit path of one of said keys for providing a control signal;

a NAND gate having a plurality of inputs each adapted to be energized by interconnection with individual ones of said circuit paths;

an inhibit circuit interconnected with said means for providing a control signal and with the output of said NAND gate, said inhibit circuit being responsive to an output signal from said NAND gate for inhibiting said control signal; and means for interconnecting individual ones of the circuit paths of said keys with the inputs of said NAND gate to cause said NAND gate output signal to be absent when there is a predetermined correspondence between respective ones of the circuit paths of said keys and to be present when there is other than said predetermined correspondence, whereby when said NAND gate output signal is absent, said control signal is not inhibited; and electrically actuatable lock means for unlocking in response to said control signal when said control signal is not inhibited, whereby said unlocking occurs only when there is said predetermined correspondence.

17. A key-actuated electronic security system comprising:

first and second keys each constituted by a plurality of circuit paths in a pattern of closed and open circuits;

means for electrically comparing respective ones of the circuit paths of said keys, comprising:

means responsive to at least one closed circuit path of one of said keys for providing a control signal;

a plurality of Exclusive-OR gates each having a pair of inputs each of which is adapted to be energized by respective ones of the circuit paths of said keys;

a NOR gate having a plurality of inputs interconnected with respective ones of the outputs of said Exclusive-OR gates;

an inhibit circuit interconnected with said means for providing a control signal and with the output of said NOR gate, said inhibit circuit being responsive to an output signal from said NOR gate for inhibiting said control signal; and means for interconnecting individual ones of the circuit paths of said keys with the inputs to said Exclusive-OR gates to cause said NOR gate output signal to be present when there is a predetermined correspondence between respective ones of the circuit paths of said keys and to be absent when there is other than predetermined correspondence, whereby when said NOR gate output signal is present, said control signal is not inhibited; and electrically actuatable lock means for unlocking in response to said control signal when said control signal is not inhibited, whereby said unlocking occurs only when there is said predetermined correspondence.

18. A key-actuated security system comprising:

a plurality of remote stations each adapted to provide electrical interconnection with a key constituted by a plurality of circuit paths in a pattern of closed and open circuits; and a central control station interconnected with said remote stations, said control station adapted to provide electrical interconnection with a plurality of keys each constituted by a plurality of circuit paths in a pattern of closed and open circuits, there being one of said plurality of keys for each of said remote stations, at least some of said plurality of keys having arrangements of circuit paths which arrangements are different from each other, said control station comprising:

means for comparing circuit paths of successive ones of the individual keys interconnected at remote stations with respective circuit paths of corresponding ones of said plurality of keys and operative to deliver an output signal when there is a predetermined correspondence between respective ones of the circuit paths compared; and means for transmitting said output signal to one of said remote stations where a key provides said predetermined correspondence;

said remote stations each including means responsive to said output signal for indicating said predetermined correspondence.

19. A key-actuated security system comprising:

a plurality of remote stations each adapted to provide electrical interconnection with a key constituted by a plurality of circuit paths in a pattern of closed and open circuits; and a central control station interconnected with said remote stations, said control station adapted to provide electrical interconnection with a plurality of keys each constituted by a plurality of circuit paths in a pattern of closed and open circuits, there being one of said plurality of keys for each of said remote stations, at least some of said plurality of keys having arrangements of circuit paths which arrangements are different from each other;

means for comparing circuit paths of keys interconnected at remote stations with respective circuit paths of corresponding ones of said plurality of keys and operative to determine when there is a predetermined correspondence between respective ones of the circuit paths compared; and means responsive to operation of the comparing means for indicating said predetermined correspondence.

20. A key-actuated security system comprising:

a plurality of remote stations each adapted to provide electrical interconnection with a key constituted by a plurality of circuit paths in a pattern of closed and open circuits; and a central control station interconnected with said remote stations, said control station adapted to provide electrical interconnection with a plurality of keys each constituted by a plurality of circuit paths in a pattern of closed and open circuits, there being one of said plurality of keys for each of said remote stations, at least some of said plurality of keys having arrangements of circuit paths which arrangements are different from each other, said control station comprising:

means interconnected with each of said remote stations and responsive to interconnection of an individual key at a respective one of said remote stations for providing a first control signal;

means interconnected with each of said remote stations for comparing circuit paths of individual keys interconnected at remote stations with respective circuit paths of corresponding ones of said plurality of keys, including first logic gate means operative to provide a second control signal when there is a predetermined correspondence between respective ones of the circuit paths compared;

further logic gate means responsive to said first and second control signals for delivering an output signal when said control signals are concurrently present; and means for transmitting said output signal to one of said remote stations where a key provides said predetermined correspondence;

said remote stations each including means responsive to said output signal for indicating said predetermined correspondence.

21. A key-actuated security system as set forth in claim 20 wherein said first logic gate means includes input terminals adapted to be supplied with input signals when there is other than said predetermined correspondence between respective ones of the circuit paths compared.

22. A key-actuated security system as set forth in claim 21 wherein said first logic gate means comprises a plurality of logic gates each corresponding to one of the remote stations and each providing an output signal when respective circuit paths compared are each closed circuits, and a further logic gate having input terminals interconnected with the output terminals of said plurality of logic gates and providing an output signal constituting said second control signal unless one of said plurality of logic gates provides an output signal.

23. A key-actuated security system as set forth in claim 22 wherein said plurality of logic gates are constituted by a plurality of AND gates and said further logic gate is constituted by a NOR gate.

24. A key-actuated security system as set forth in claim 21 wherein said predetermined correspondence is constituted by an identical relationship between respective ones of the key circuit paths compared and wherein said first logic gate means comprises a plurality of logic gates each providing an output signal when respective circuit paths compared are respectively constituted by a closed and open circuit, and a further logic gate having input terminals interconnected with the output terminals of said plurality of logic gates and providing an output signal constituting said second control signal unless one of said plurality of logic gates provides an output signal.

25. A key-actuated security system as set forth in claim 24 wherein said plurality of logic gates are constituted by a plurality of Exclusive-OR gates and said further logic gate is constituted by a NOR gate.

26. A key-actuated security system as set forth in claim 21, said system including a plurality of circuit leads connecting each of said remote stations in common with said means for comparing circuit paths, there being one of said leads for each circuit path of a key interconnected at a remote station.

27. A key-actuated security system as set forth in claim 26 further comprising means for connecting each of said leads in a circuit, including a respective isolation diode, with a respective circuit path of each of said plurality of keys.

28. A key-actuated security system as set forth in claim 26 wherein said means for comparing circuit means includes means for counting the closed circuits of respective individual keys interconnected at remote stations and operative to inhibit said first control signal if the number of closed circuits of an individual key is less than a constrained number of closed circuits.

29. A key-actuated security system as set forth in claim 28 wherein said means for counting comprises a digital-to-analog converter having an output terminal interconnected with one of the input terminals of said first logic gate means.

30. A key-actuated security system as set forth in claim 26 further comprising means for sequentially interrogating said remote stations to cause connection of circuit paths of keys at said remote stations to said leads, said plurality of logic gates each being responsive to operation of the interrogation means.

31. A key-actuated security system as set forth in claim 20 wherein each of said remote station comprises a key receptacle including contacts for providing said interconnection with a key.

32. A key-actuated security system as set forth in claim 20 wherein said means responsive to said output signal comprises an electric latch, operation of which thereby indicates said predetermined correspondence.

33. A key-actuated security system as set forth in claim 20 wherein said control station further comprises alarm means for signalling when a key interconnected at a remote station fails to provide said predetermined correspondence.

34. A key-actuated security system comprising:

a plurality of remote stations each adapted to provide electrical interconnection with a key constituted by a plurality of circuit paths in a pattern of closed and open circuits; and a central control station interconnected with said remote stations, said control station adapted to provide electrical interconnection with a plurality of keys each constituted by a plurality of circuit paths in a pattern of closed and open circuits, there being one of said plurality of keys for each of said remote stations, at least some of said plurality of keys having arrangements of circuit paths which arrangements are different from each other, said control station comprising:

means for sequentially interrogating said remote stations;

means interconnected with each of said remote stations for comparing circuit paths of individual keys interconnected at remote stations respectively interrogated with respective circuit paths of corresponding ones of said plurality of keys and operative to deliver an output signal when there is a predetermined correspondence between respective ones of the circuit paths compared;

means for transmitting said output signal to one of said remote stations where a key provides said predetermined correspondence;

said remote stations each including means responsive to interconnection of a key at the respective remote station and to said output signal when the respective remote station is interrogated for indicating said predetermined correspondence.

35. A key-actuated security system as set forth in claim 34 wherein the interrogation means includes an interrogation code generator, each of said remote stations and said central station including a decoder operative in response to the interrogation code to determine which respective remote station is interrogated.

36. A key-actuated security system as set forth in claim 35 wherein said interrogation code generator comprises a counter, said system including an oscillator for advancing the count of said counter, said decoders each comprising a plurality of logic gate means responsive to the count of said counter.

37. A key-actuated security system as set forth in claim 36 wherein said counter comprises a binary ripple counter having a plurality of binary stages, the logic gate means of each of said decoders being constituted by a plurality of logic AND gates whose input terminals are connected with respective ones of the binary stages.

38. A key-actuated security system as set forth in claim 35 including a first plurality of circuit leads connecting each of said remote stations in common with said means for comparing circuit paths, there being one of said leads for each circuit path of a key interconnected at a remote station.

39. A key-actuated security system as set forth in claim 38 including a further plurality of circuit leads connecting decoders of said remote stations in common with said code generator.

40. A key-actuated security system as set forth in claim 38 including means for transmitting the interrogation code over said leads to each of the remote stations, the remote stations each comprising means, including a time delay circuit, for connecting the circuit paths of a key interconnected at the remote station with respective ones of said leads in response to interrogation of the respective remote station.

41. A key-actuated security system as set forth in claim 40 wherein said time delay circuit comprises a one-shot multivibrator.

42. A key-actuated security system comprising:

a plurality of remote stations each adapted to provide electrical interconnection with a key constituted by a plurality of circuit paths in a pattern of closed and open circuits; and a central control station interconnected with said remote stations, said control station adapted to provide electrical interconnection with a plurality of keys each constituted by a plurality of circuit paths in a pattern of closed and open circuits, there being one of said plurality of keys for each of said remote stations, at least some of said plurality of keys having arrangements of circuit paths which arrangements are different from each other, said control station comprising;

means for sequentially interrogating said remote stations;

means interconnected with each of said remote stations and responsive to interconnection of an individual key at a respective one of said remote stations for providing a first control signal;

means interconnected with each of said remote stations for comparing circuit paths of individual keys interconnected at remote stations with respective circuit paths of corresponding ones of said plurality of keys, including first logic gate means operative to provide a second control signal when there is a predetermined correspondence between respective ones of the circuit paths compared;

further logic gate means responsive to said first and second control signals for delivering an output signal when said control signals are concurrently present; and means for transmitting said output signal to one of said remote stations where a key provides said predetermined correspondence;

said remote stations each including means responsive to interconnection of a key at the respective remote station and to said output signal when the respective remote station is interrogated for indicating said predetermined correspondence.

* * * * *